United States Patent
Kitamura et al.

(10) Patent No.: US 8,150,140 B2
(45) Date of Patent: Apr. 3, 2012

(54) SYSTEM AND METHOD FOR A SEMICONDUCTOR LITHOGRAPHIC PROCESS CONTROL USING STATISTICAL INFORMATION IN DEFECT IDENTIFICATION

(75) Inventors: Tadashi Kitamura, Yokohama (JP); Akio Ishikawa, Yokohama (JP)

(73) Assignee: NGR Inc., Tokyo (JP)

( * ) Notice: Subject to any disclaimer, the term of this patent is extended or adjusted under 35 U.S.C. 154(b) by 67 days.

(21) Appl. No.: 12/725,141

(22) Filed: Mar. 16, 2010

(65) Prior Publication Data
US 2010/0215247 A1 Aug. 26, 2010

Related U.S. Application Data

(63) Continuation-in-part of application No. 12/637,331, filed on Dec. 14, 2009.

(30) Foreign Application Priority Data

Dec. 22, 2008 (JP) ................................. 2008-326258

(51) Int. Cl.
*G06K 9/00* (2006.01)
(52) U.S. Cl. .......................... 382/141; 348/126; 700/110
(58) Field of Classification Search .................. 382/100, 382/141, 144, 145, 146, 147, 148, 149, 150
See application file for complete search history.

(56) References Cited

U.S. PATENT DOCUMENTS

| | | |
|---|---|---|
| 4,583,854 A | 4/1986 | Lozar |
| 4,589,139 A | 5/1986 | Hada et al. |
| 4,805,123 A | 2/1989 | Specht et al. |
| 4,958,374 A | 9/1990 | Tokita et al. |
| 5,046,109 A | 9/1991 | Fujimori et al. |
| 5,046,113 A | 9/1991 | Hoki |
| 5,051,585 A | 9/1991 | Koshishiba et al. |
| 5,137,362 A | 8/1992 | LeBeau |
| 5,270,796 A | 12/1993 | Tokui et al. |
| 5,379,350 A | 1/1995 | Shimazu et al. |
| 5,398,292 A | 3/1995 | Aoyama |

(Continued)

FOREIGN PATENT DOCUMENTS

DE 19803021 A1 7/1996

(Continued)

OTHER PUBLICATIONS

U.S. Appl. No. 11/987,766 Restriction Requirement mailed May 20, 2010, 9 pages.

(Continued)

*Primary Examiner* — Anand Bhatnagar
(74) *Attorney, Agent, or Firm* — Lathrop & Gage LLP

(57) ABSTRACT

A system and method is described for evaluating a wafer fabrication process for forming patterns on a wafer based upon data. Multiple inspection regions are defined on the wafer for analysis. For each inspection region, images of patterns within the inspection region are captured, edges are detected, and lines are registered to lines of a reference pattern automatically generated from the design data. Line widths are determined from the edges. Measured line widths are analyzed to provide statistics and feedback information regarding the fabrication process. In particular embodiments defects are identified as where measured line widths lie outside boundaries determined from the statistics. In particular embodiments, lines of different drawn width and/or orientation are grouped and analyzed separately. Measured line widths may also be grouped for analysis according to geometry such as shape or proximity to other shapes in the inspection region to provide feedback for optical proximity correction rules.

17 Claims, 19 Drawing Sheets

U.S. PATENT DOCUMENTS

| | | | |
|---|---|---|---|
| 5,479,537 A | 12/1995 | Hamashima et al. | |
| 5,533,144 A | 7/1996 | Fan | |
| 5,563,702 A | 10/1996 | Emery et al. | |
| 5,574,800 A | 11/1996 | Inoue et al. | |
| 5,600,734 A | 2/1997 | Okubo et al. | |
| 5,764,793 A | 6/1998 | Omae et al. | |
| 5,796,868 A | 8/1998 | Dutta-Choudhury | |
| 5,801,965 A | 9/1998 | Takagi et al. | |
| 5,978,501 A * | 11/1999 | Badger et al. | 382/144 |
| 6,023,530 A | 2/2000 | Wilson | |
| 6,040,911 A | 3/2000 | Nozaki et al. | |
| 6,047,083 A | 4/2000 | Mizuno | |
| 6,049,895 A | 4/2000 | Sugimoto | |
| 6,072,897 A | 6/2000 | Greenberg et al. | |
| 6,222,935 B1 | 4/2001 | Okamoto | |
| 6,356,300 B1 | 3/2002 | Shiba | |
| 6,399,953 B1 | 6/2002 | Kitamura | |
| 6,400,839 B1 | 6/2002 | Takayama | |
| 6,504,947 B1 | 1/2003 | Nozaki et al. | |
| 6,535,621 B1 | 3/2003 | Fujita | |
| 6,539,106 B1 | 3/2003 | Gallarda et al. | |
| 6,546,308 B2 | 4/2003 | Takagi et al. | |
| 6,868,175 B1 | 3/2005 | Yamamoto et al. | |
| 7,181,059 B2 | 2/2007 | Duvdevani et al. | |
| 7,206,443 B1 | 4/2007 | Duvdevani et al. | |
| 7,234,128 B2 | 6/2007 | Gau et al. | |
| 7,388,978 B2 | 6/2008 | Duvdevani et al. | |
| 7,526,119 B2 * | 4/2009 | Isomura et al. | 382/148 |
| 2004/0081350 A1 | 4/2004 | Kitamura et al. | |
| 2004/0120571 A1 * | 6/2004 | Duvdevani et al. | 382/149 |
| 2004/0126005 A1 | 7/2004 | Duvdevani et al. | |
| 2005/0146714 A1 | 7/2005 | Kitamura et al. | |
| 2005/0226494 A1 * | 10/2005 | Yamamoto et al. | 382/149 |
| 2006/0245636 A1 * | 11/2006 | Kitamura et al. | 382/149 |
| 2009/0110262 A1 * | 4/2009 | Noguchi et al. | 382/145 |

FOREIGN PATENT DOCUMENTS

| | | |
|---|---|---|
| EP | 0930499 | 7/1999 |
| JP | 63088682 | 4/1988 |
| JP | 63-210606 | 9/1988 |
| JP | 03-235949 | 10/1991 |
| JP | 04-172239 | 6/1992 |
| JP | 4-194702 | 7/1992 |
| JP | 02299481 | 9/1992 |
| JP | 8-76359 | 3/1996 |
| JP | 08110305 | 4/1996 |
| JP | 09-312318 | 12/1997 |
| JP | 10307917 | 11/1998 |
| JP | 10312461 | 11/1998 |
| JP | 11231507 | 8/1999 |
| JP | 2001-338304 | 12/2001 |
| JP | 2002-515850 | 5/2002 |
| JP | 2002-310929 | 10/2002 |
| JP | 2003-100825 | 4/2003 |
| WO | WO 99/59200 | 11/1999 |

OTHER PUBLICATIONS

U.S. Appl. No. 11/987,766 Response to Restriction Requirement filed Jun. 20, 2010, 21 pages.

U.S. Appl. No. 11/987,766 Office Action mailed Nov. 24, 2010, 8 pages.

"Automatic Failure Part Tracing Method for a Logic LSI Using an Electron Beam Tester", NEC Technical Report, vol. 50, No. 6, 1997, pp. 20-31 (partial English translation).

Official Notice of Rejection, Japanese Patent Office, dated Feb. 21, 2003, for Patent Appln. No. 2000-258234, with English Translation.

U.S. Appl. No. 11/044,159, Notice of Allowance dated Sep. 25, 2009, 9 pages.

U.S. Appl. No. 11/044,159, Terminal Disclaimer dated Aug. 11, 2009, 3 pages.

U.S. Appl. No. 11/044,159, Response to Office Action dated Jul. 31, 2009, 13 pages.

U.S. Appl. No. 11/044,159, Office Action dated Jun. 12, 2009, 22 pages.

U.S. Appl. No. 11/044,159, Response to Office Action dated Mar. 25, 2009, 16 pages.

U.S. Appl. No. 11/044,159, Office Action dated Dec. 11, 2008, 20 pages.

U.S. Appl. No. 11/044,159, Response to Office Action dated Aug. 29, 2008, 16 pages.

U.S. Appl. No. 11/044,159, Office Action dated Apr. 30, 2008, 11 pages.

U.S. Appl. No. 09/648,372, Notice of Allowance dated Oct. 28, 2004, 7 pages.

U.S. Appl. No. 09/648,372, Response and Amendment dated Sep. 3, 2004, 14 pages.

U.S. Appl. No. 09/648,372, Office Action dated Jun. 3, 2004, 7 pages.

U.S. Appl. No. 09/648,372, Preliminary Amendment and Response to Restriction Requirement dated Mar. 18, 2004, 15 pages.

U.S. Appl. No. 09/648,372, Restriction Requirement dated Feb. 19, 2004, 5 pages.

U.S. Appl. No. 09/648,372, Response to Office Action dated Dec. 12, 2003, 31 pages.

U.S. Appl. No. 09/648,372, Office Action dated Aug. 13, 2003, 7 pages.

U.S. Appl. No. 11/058,616, Office Action dated Aug. 14, 2009, 22 pages.

U.S. Appl. No. 11/058,616, Response to Office Action filed Nov. 9, 2009, 28 pages.

U.S. Appl. No. 11/058,616, Office Action dated Jan. 13, 2010, 7 pages.

U.S. Appl. No. 11/058,616, Response to Office Action filed Apr. 26, 2010, 29 pages.

U.S. Appl. No. 11/434,797, Office Action dated Aug. 17, 2009, 18 pages.

U.S. Appl. No. 11/434,797, Response to Office Action filed Nov. 9, 2009, 18 pages.

U.S. Appl. No. 11/434,797, Office Action dated Jan. 15, 2010, 8 pages.

U.S. Appl. No. 11/434,797, Response to Office Action filed Apr. 14, 2010, 16 pages.

U.S. Appl. No. 11/434,797, Notice of Allowance dated May 10, 2010, 6 pages.

U.S. Appl. No. 11/987,766, Office Action dated Jan. 15, 2010, 11 pages.

U.S. Appl. No. 11/987,766, Office Action filed Apr. 14, 2010, 23 pages.

Hashimoto, K, et al. "Tolerance-Based Wafer Verification Methodologies with a Die-to-Database Inspection System", Jpn. J. Appl Phys. 48 (2009), pp. 076502-1-502-7.

Hagio, Y, et al. "Novel Mask-Qualification Methodology with Die-to-Database Wafer Inspection System", Proc. of SPIE 7379 (2009), pp. 73790V-1-90V-9.

Hagio, Y, et al. "Hotspot Management for Spacer Patterning Technology with Die-to-Database Wafer Inspection System", Proc. of SPIE 7275 (2009), pp. 72750V-1-50V-10.

Yang, H, et al. "Systematic Defect Filtering and Data Analysis Methodology for Design Based Metrology", Proc. of SPIE (2009), 8 pages.

Kim, J. et al. "The APC (Advanced Process Control) Procedure for Process Window and CDU improvement using DBMs", Proc. of SPIE 7140 (2008), pp. 71403G-1-03G-11.

Yune, H, et al. "CD uniformity improvement of sub 60nm contact hole using model based OPC", Proc. of SPIE 7140 (2008), pp. 71403E-1-03E-8.

Park, D, et al. "Novel process proximity correction by the pattern to pattern matching method with DBM", Proc. of SPIE 7140 (2008), pp. 71403K-1-03K-8.

Hashimoto, K. et al. "Hot Spot Management with Die-to-Database Wafer Inspection System", Proc of SPIE 6925 (2008), pp. 692517-1-517-8.

Hashimoto, M., et al., High-Speed Template Matching Algorithm Using Information of Contour Points, Systems and Computers in Japan. vol. 23, No. 9, 1992, pp. 78-87.

Haralick, R.M., Digital Step Edges from Zero Crossing of Second Directional Derivatives, IEEE Transactions on Pattern Analysis And Machine intelligence, vol. PAMI-6. No. 1, Jan. 1984. pp. 58-68.

Park, J, et al. "Systematic Defect Inspection and Verification for Distributions of Critical Dimension in OPC Models Utilizing Design Based Metrology Tool", Proc. of SPIE 6922 (2008), pp. 69222C-1-22C-9.

Yang, H, et al. "Wide Applications of Design Based Metrology with Tool Integration", Proc. of SPIE 6922 (2008), pp. 692239-1-239-7.

Kitamura, T, et al. "A New Robust Process Window Qualification (PWQ) Technique to Perform Systematic Defect Characterization to Enlarge the Lithographic Process Window, using a Die-to-Database Verification Tool (NGR2100)", Proc. of SPIE 6925 (2008), pp. 692519-1-519-5.

Yamaguchi, S. et al. "Accuracy of Mask Pattern Contour Extraction with Fine-pixel SEM Images", Proc. of SPIE 6730 (2007), pp. 673036-1-036-12.

Lau, M, et al. "A SEM-based System for Photomask Placement Metrology", Proc. of SPIE 6607 (2007), pp. 660727-1-727-11.

Melliar-Smith, M. "Lithography Beyond 32nm—A Role for Imprint?", Proc. of SPIE (2007), 14 pages.

Kitamura, T. et al. "Die-to-Database Verification Tool for detecting CD errors, which are caused by OPC Features, by using Mass Gate Measurement and Layout information", Proc. of SPIE 6518 (2007). pp. 651834-1-834-5.

Yang, H. et al. "Advanced Process Control with Design Based Metrology", Proc. of SPIE 6518 (2007), pp. 651821-1-821-8.

Kim, J, et al. "OPC and Design Verification for DFM using Die-to-Database Inspection", Proc. of SPIE 6521 (2007), pp. 652117-1-117-10.

Kim, C, et al. "DFM flow by using combination between design based metrology system and model based verification at sub-50nm memory device", Proc. of SPIE 6521 (2007), pp. 65210T-1-10T-4.

Tsuneoka, M. et al. "Direct Die to Database Electron Beam Inspection of Fused Silica imprint Templates", Proc. of SPIE 6349 (2006), pp. 63492D-1-92D-8.

Hoffman, M, et al. "Introduction of a Die-to-Database Verification Tool for Mask Geometry NGR4000". Proc. of SPIE 6349 (2006), pp. 634940-1-940-6.

Yang, H, et al. "New OPC Verification Method using Die-to-Database Inspection", Proc. of SPIE 6152 (2006), pp. 615232-1-232-9.

Myron, L, et al. "Defect Inspection for Imprint Lithography Using a Die to Database Electron Beam Verification System", Proc. of SPIE (2006), 9 pages.

Kitamura, T, et al. "Introduction of a Die-to-Database Verification Tool for the Entire Printed Geometry of a Die—Geometry Verification System NGR2100 for DFM". Proc. of SPIE 5853 (2005), pp. 988-999.

Kitamura, T. et al., Die-to-Database Verification Tool for detecting CD errors, which are caused by OPC Features, by using Mass Gate Measurement and Layout Information (2007), 9 pages.

Wada, S. & Nakamura, T., Automatic Fault Tracing Method With Electron Beam Tester for Logic LSIs, NEC Technical Report, vol. 50, No. 6, 1997 (with partial English translation) 36 pages.

Steger, C., An Unbiased Detector of Curvilinear Structures, IEEE Transactions on Pattern Analysis and Machine Intelligence, vol. 20. No. 2, Feb. 1998, pp. 113-125.

Pavlidis, T. & Horowitz. S.L., Segmentation of Plane Curves, IEEE Transactions on Computers vol. c-23, No. 8, Aug. 1974, pp. 860-870.

U.S. Appl. No. 11/987,766, Response to Advisory Action filed Feb. 22, 2011, 15 pages.

U.S. Appl. No. 11/987,766, Advisory Action mailed Feb. 2, 2011, 3 pages.

U.S. Appl. No. 11/987,766, Response to Final Office Action filed Jan. 24, 2011, 18 pages.

U.S. Appl. No. 11/987,766, Examiner Interview Summary mailed Jan. 20, 2011, 3 pages.

U.S. Appl. No. 11/987,766, Examiner Interview Summary mailed Dec. 29, 2010, 3 pages.

U.S. Appl. No. 12/852,314, Response to Office Action filed Feb. 16, 2011, 20 pages.

U.S. Appl. No. 12/852,314 Office Action mailed Nov. 19, 2010, 17 pages.

U.S. Appl. No. 11/987,766, Restriction Requirement mailed Jul. 27, 2010, 7 pages.

U.S. Appl. No. 11/987,766, Response to Restriction Requirement filed Aug. 24, 2010, 17 pages.

U.S. Appl. No. 11/058,616, Notice of Allowance mailed Jun. 14, 2010, 6 pages.

Resnick, D. et al., "A template infrastructure for step-and-flash imprint lithography", Microlithography World, Feb. 2006, Accessed on the Internet Mar. 9, 2006.

Resnick, D. et al., "Template Advances in Step and Flash Imprint Lithography", undated, 5 pages.

Melliar Smith, M. et al. "Step and Flash Imprint for Silicon integrated Circuit Applications" NGL 2006, Jul. 6-7, 2006, Tokyo, Japan, 4 pages.

Kitamura, T., Hasebe, T. et al. "Die-to-database verification tool using mass gate measurement and Layout Information for detecting critical dimension errors" Proc. of SPIE vol. 6518 (2007) pp. 651834-1-651834-9.

U.S. Appl. No. 11/987,766, Notice of Allowance mailed Mar. 2, 2011, 7 pages.

U.S. Appl. No. 12/852,314, Notice of Allowance and Examiner Interview Summary mailed Jul. 14, 2011, 8 pages.

U.S. Appl. No. 12/852,314, Response to Office Action filed Jun. 17, 2011, 12 pages.

U.S. Appl. No. 12/852,314, Office Action mailed Apr. 20, 2011, 11 pages.

\* cited by examiner

NOT DRAWN TO SCALE

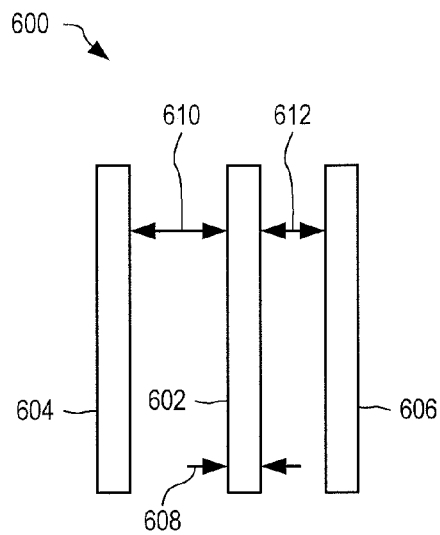
FIG. 6
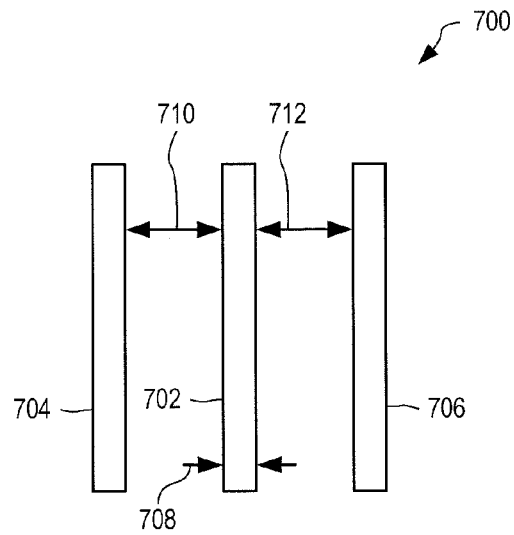
FIG. 7
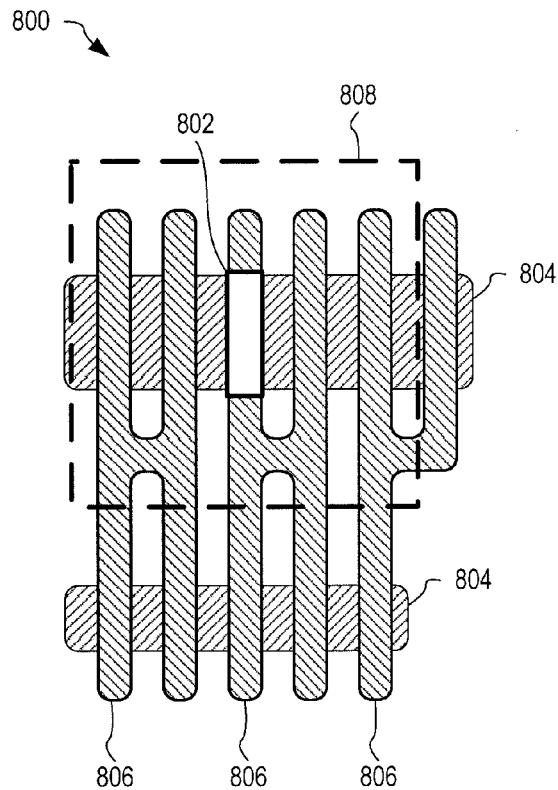
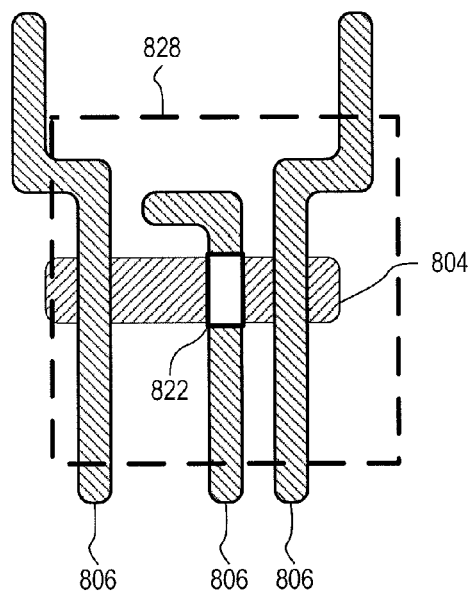
FIG. 8

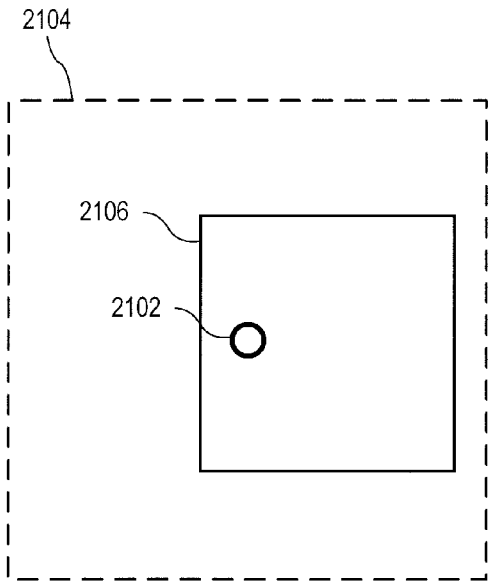
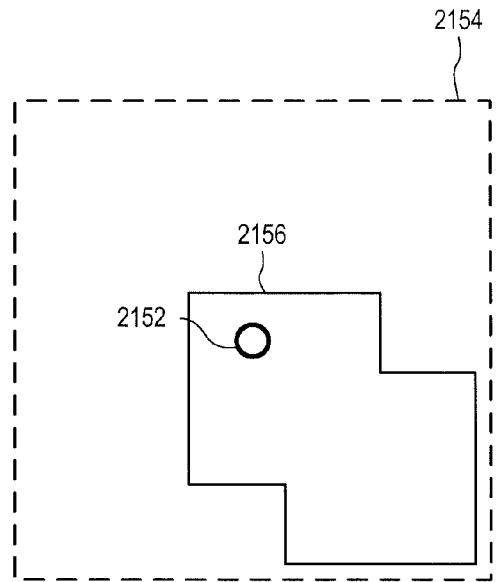
FIG. 21A                FIG. 21B
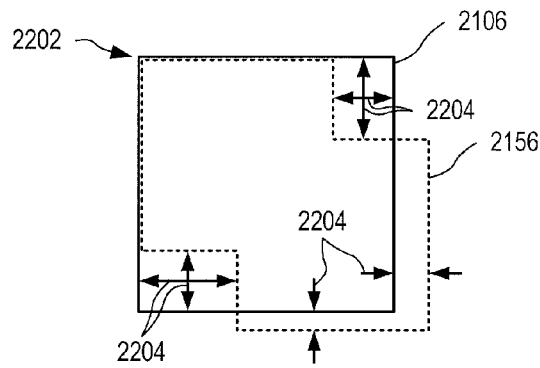
FIG. 22
|    | D₁ | D₂ | D₃ | D₄ | D₅ |
|----|----|----|----|----|----|
| D₁ |    | 10 | 10 | 50 | 50 |
| D₂ | 10 |    | 12 | 50 | 50 |
| D₃ | 10 | 12 |    | 50 | 50 |
| D₄ | 50 | 50 | 50 |    | 10 |
| D₅ | 50 | 50 | 50 | 10 |    |
FIG. 23

US 8,150,140 B2

SYSTEM AND METHOD FOR A SEMICONDUCTOR LITHOGRAPHIC PROCESS CONTROL USING STATISTICAL INFORMATION IN DEFECT IDENTIFICATION

CLAIM TO PRIORITY

The present application claims benefit of priority from U.S. patent application Ser. No. 12/637,331 filed Dec. 14, 2009, the disclosure of which is hereby incorporated by reference. U.S. patent application Ser. No. 12/637,331 in turn claims priority from Japanese patent application number 2008-326258 filed Dec. 22, 2008.

BACKGROUND

Manufacture of semiconductor wafers uses a complex and precise lithographic process. Quality control and analysis of the lithographic process through each stage of wafer manufacture is critical to ensure the quality and reliability of the final product. Inconsistencies within the lithographic process are undesirable and early detection and correction of these inconsistencies saves a significant amount of time and expense for the manufacturer. For example, if problems with lithographic line and space definition are identified after resist development and before etching, wafers can be reworked. Similarly, if lithographic issues can be identified soon after etching, process adjustments can be made or replacement wafers started many weeks sooner than required if problems are detected after wafer completion and electrical testing.

Typically, wafers are viewed and measured using a critical dimension-scanning electron microscope (CD-SEM) technique, wherein an electron microscope is used to image pattern features within a small portion of a wafer and measurements of the pattern features are made. However, the CD-SEM technique images only a small portion (e.g., less than 1 μm square at a time without distortion) of the wafer, and requires many days or weeks of continuous imaging and analysis to evaluate the entire wafer. Thus, manufacturers typically image a few sample points of a wafer using CD-SEM to evaluate the wafer as a whole. Such limited sampling, however, may not be representative of the wafer as a whole. Further, CD-SEM typically makes a single critical dimension (CD) measurement of each imaged pattern, which may give skewed results because of localized process variation across a wafer. That is, the CD measurement made by CD-SEM may not be particularly representative of the wafer as a whole because of the localized process variation.

In the view of measurement accuracy of CD-SEM devices, errors in line width measurements of a pattern are near to an allowable error of control values of process conditions. It is necessary to improve accuracy of the measurement of the line width of the pattern by using an average of measurements of line widths of patterns.

SUMMARY

An apparatus and method is described for evaluate a wafer fabrication process for forming patterns on a wafer based upon design data. Within a recipe database, multiple inspection regions are defined on the wafer for analysis. For each inspection region, at least one image of patterns within the inspection region is captured, and lines of that image are registered to lines of a reference pattern automatically generated from the design data. Edges are identified and used to measure line widths. Measured line widths are statistically analyzed to provide feedback information regarding the fabrication process. Defects are identified as where measured line widths vary from the mean in an inspection region. Lines of different drawn width and/or orientation are automatically grouped and analyzed separately. Measured line widths may also be grouped for analysis according to geometric information such as proximity to other shapes in the inspection region to provide feedback for optical proximity correction rules.

In an embodiment, a method of evaluating a wafer fabrication process for forming patterns on a wafer based upon design data involves defining two or more inspection regions on the wafer for analysis. Patterns are automatically selected in each of the inspection regions, and images are captured with an imaging device. These images are automatically registered to reference patterns derived from design data. Edges are detected in each image, and used to determine measured line widths of actual lines on the wafer. The measurements of each inspection region are processed separately to form statistical information associated with the fabrication process. In specific embodiments, defects are identified by determining as where measured line widths vary from the mean in an inspection region. Lines of different drawn width and/or orientation are automatically grouped and analyzed separately. Measured line widths may also be grouped for analysis according to geometric information such as line orientation, line length, and proximity to other shapes in the inspection region to provide feedback for optical proximity correction rules, In an embodiment, an apparatus for performing a method of evaluating a wafer fabrication process for forming patterns on a wafer based upon design data is described. This apparatus has an imaging device for providing images of inspection regions of the wafer, and a processing system for processing the images to extract lines, to measure line widths and end shrinkage, and to perform statistical analysis of the measured line widths. The images are automatically registered to reference patterns derived from design data such that measured lines can be classified by drawn line width and identified by cell instance names. Edges are detected in each image, and used to determine measured line widths of lines on the wafer. The measurements of each inspection region are processed separately to form statistical information associated with the fabrication process. In specific embodiments, defects are identified by determining as where measured line widths vary from the mean in an inspection region. Lines of different drawn width and/or orientation are automatically grouped and analyzed separately. Measured line widths may also be grouped for analysis according to geometric information such as line orientation, line length, and proximity to other shapes in the inspection region to provide feedback for optical proximity correction rules,

BRIEF DESCRIPTION OF THE FIGURES

FIG. 6 and FIG. 7 are schematic diagrams showing exemplary portion of the design data of FIG. 1 that show a pattern and its spacing to two adjacent patterns.

FIG. 8 graphically shows two exemplary layers in a portion of the design data of FIG. 1.

FIGS. 21A and 21B shows identified first and second defects, around each of which a first and second design data windowing region is centered and used to isolate first and second design data patterns, respectively.

FIG. 22 shows the pattern of FIG. 21B overlaid upon the pattern of FIG. 21A such that vertices of the patterns coincides to measure a difference value that is indicative of similarity in the patterns.

FIG. 23 shows an exemplary table of difference values for five identified defects.

DETAILED DESCRIPTION OF THE EMBODIMENTS

Figure 1:
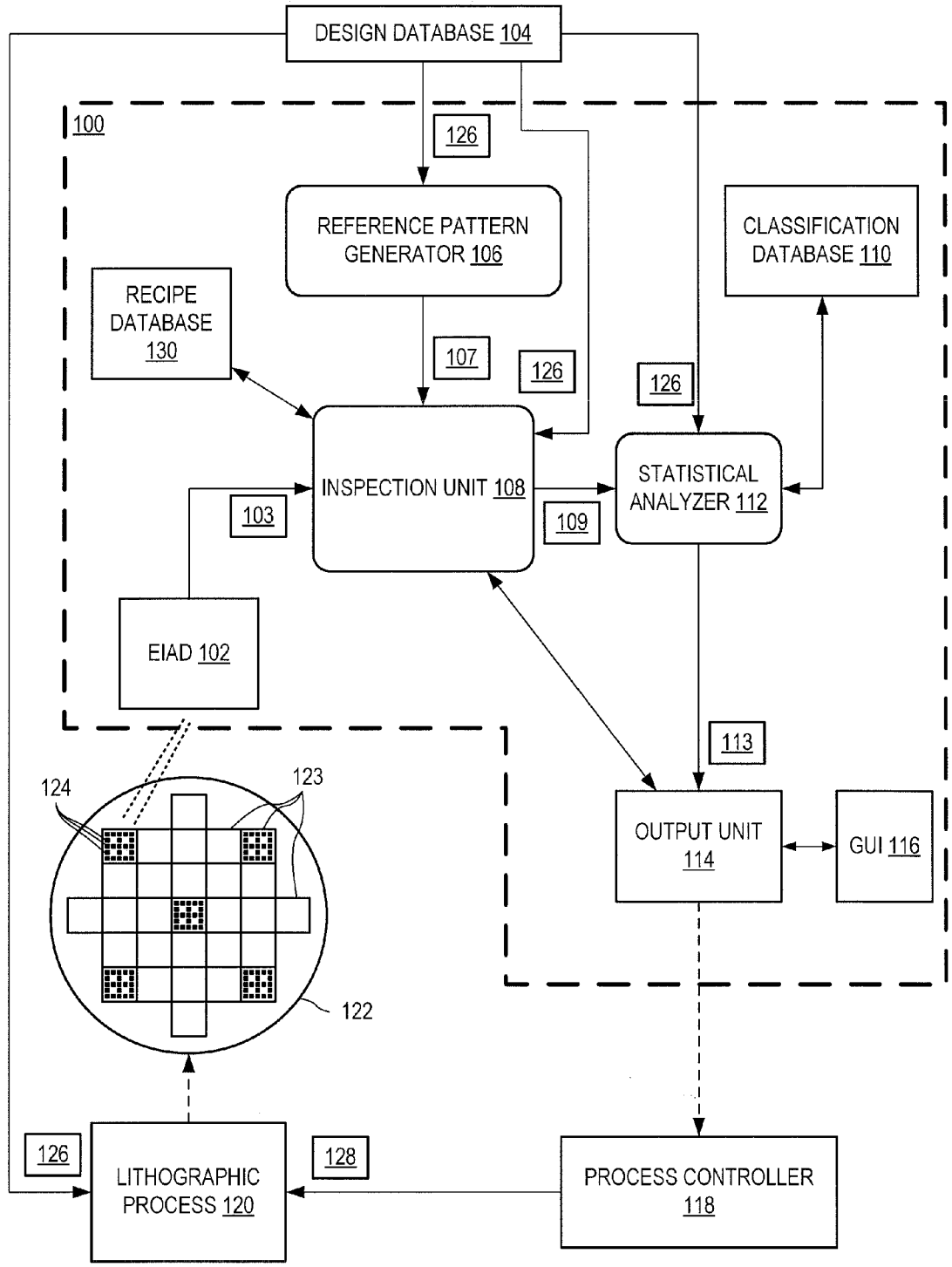
FIG. 1 shows one exemplary analysis system for a semiconductor lithographic process, in an embodiment.

FIG. 1 shows an exemplary analysis system 100 for a semiconductor lithographic process 120. System 100 includes an electron image acquiring device (EIAD) 102, a reference pattern generator 106, an inspection unit 108, a statistical analyzer 112 and an output unit 114. System 100 may also include a graphical user interface (GUI) 116 that allows a user to interact with system 100 and view output from statistical analyzer 112.

Lithographic process 120 fabricates, under control of at least one control input 128 of a process controller 118, a plurality of shots 123, or patterns, on a wafer 122 based upon fabrication data (not shown). Fabrication data is derived through a series of transformations, which may include coordinate transformations, size adjustments, and addition of additional shapes to comply with optical proximity correction rules, from design data 126 of design database 104. Design data 126 represents computer aided design (CAD) data for producing at least one die within each shot 123 of wafer 122. Typically, design data 126 includes a machine readable representation of lines and other polygonal shapes that a design engineer desires appear on a finished wafer for each layer of interest of the design; the design engineer may enter shapes manually or use tools such as automatic place and route tools to generate the design data. The design data typically includes information regarding a drawn line widths and lengths of shapes the engineer needs to have formed on the wafer to form various parts of the circuit. Control input 128 may represent control of any one or more of dose, etching, and exposure of lithographic process 120, but may represent other control parameters of lithographic process 120 without departing from the scope hereof. For example, control input 128 may provide adjustments to one or more optical proximity correction (OPC) rules of lithographic process 120.

Wafer 122 is analyzed by system 100 after each of several sub-process steps (e.g., masking, etching) of lithographic process 120 such that system 100 provides input to process controller 118 to allow control inputs 128 to be selected for each sub-process of lithographic process 120 performed on wafer 122 (and/or subsequently processed wafers).

Under control of inspection unit 108, EIAD 102 acquires at least one image 103 of at least one inspection region 124 of wafer 122 using a high resolution high speed scanning secondary electron image acquisition capability. The inspection regions are defined in a process and design specification file, and may cover portions of more than one die or test pattern on the wafer, and may cover portions of more than one shot on the wafer. The EIAD includes a scan generator to acquire large area images using electron optics that eliminate field distortion over the wide scanning area. For example, EIAD 102 may capture image 103 at a resolution of 3 nm per pixel where inspection region 124 is 50 micrometers (µm) square. Image 103 of inspection region 124 may include thousands of patterns that are automatically registered and measured by inspection unit 108. The patterns are registered by detecting edges within image 103 and the detected edges are measured to generate measurements 109. Inspection unit 108 determines inspection regions 124 based upon input from a recipe database 130, which may be configured by a user of system 100 to identify specific patterns formed on wafer 122 for analysis. For example, recipe database 130 may identify particular structures of scribeline test patterns and other structures having known drawn dimensions. Inspection unit 108 may therefore control system 100, based upon recipe database 130, to automatically capture and process images of a plurality of inspection regions 124.

Reference pattern generator 106 generates reference pattern 107 from design data 126 for each imaged inspection region 124. Reference pattern 107 defines the expected geometry of patterns formed within each imaged inspection region 124 based upon the performed lithographic sub-processes on wafer 122. Reference pattern 107 contains representations of one or both of (a) one or more line segments typically oriented parallel to one or both axes, and (b) one or more curves. Reference pattern generator 106 may anticipate corner rounding and other processing variations to define reference pattern 107.

Inspection unit 108 automatically registers (i.e., aligns) and compares detected edges of image 103 to reference pattern 107 and generates measurements 109. Measurements 109 may represent the difference (bias) between detected edges and the associated reference pattern and may also represent direct measurements of edges detected in image 103. Further detail of edge detection, reference pattern, and bias measurement, as performed by system 100, may be found in a paper titled "Introduction of a die-to-database verification tool for the entire printed geometry of a die: geometry verification system NGR2100 for DFM" by Tadashi Kitamura et al. [Proc. SPIE, Vol. 5756, 73 (2005); DOI:10.1117/12.599467], hereinafter "DFM paper", and incorporated herein by reference. Further details on analysis of optical proximity correction (OPC) features may be found in a paper titled "Die-to-database verification tool for detecting CD errors, which are caused by OPC features, by using mass gate measurement and layout information" by Tadashi Kitamura et al. [Proc. SPIE, Vol. 6518, 651834 (2007); DOI:10.1117/12.712413], incorporated herein by reference.

Statistical analyzer 112 processes measurements 109 and design data 126 to determine statistical data 113 for one or more inspection regions 124, and may also utilize a classification database 110 to classify and sort measurements 109 prior to statistical analysis.

Controlling Process Conditions Using Statistics of Line Width Measurements

With the traditional CD-SEM method of measuring line widths of a pattern formed on a wafer, measurement error can be near allowable error of the control values of the process conditions. Therefore, CD-SEM measurements are often not appropriate for controlling fabrication processes. To use measurements for controlling fabrication processes, it is desirable to improve the accuracy of the measurements.

Inspection regions 124 each contain many instances of the pattern to be measured, and many inspection regions 124 are selected for analysis, such that many measurements of the pattern may be made and statistically analyzed. For example, each inspection region 124 has many instances of the pattern within each image of inspection region 124. Further, since registration of image 103 (i.e., matching of the imaged patterns to associated reference pattern 107 generated from design data 126) and measurements of patterns therein are performed automatically, multiple inspection regions may be specified (e.g., within recipe database 130) for each of multiple shots 123 on wafer 122.

Figure 24:
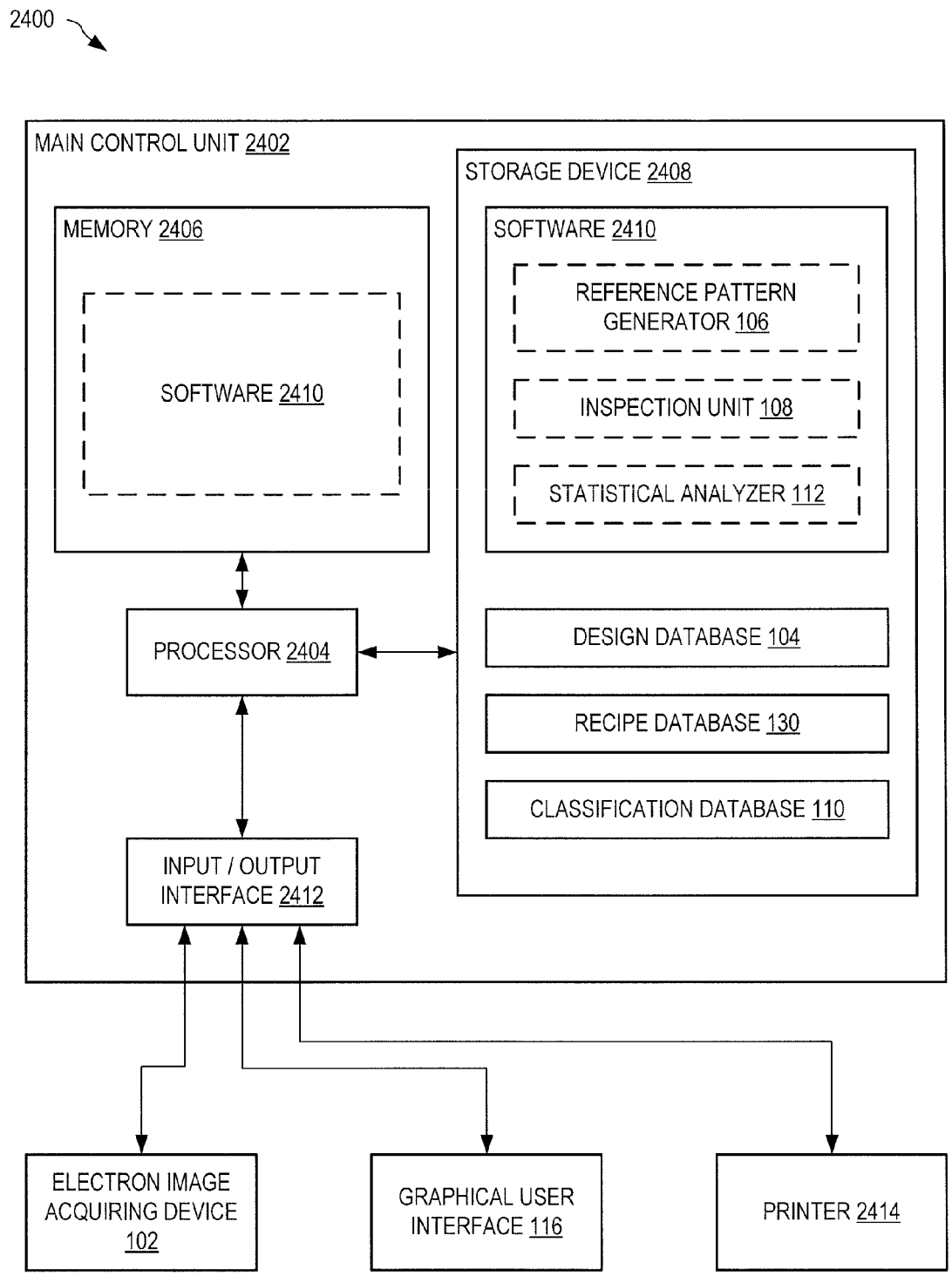
FIG. 24 schematically illustrates an analysis system for a semiconductor lithographic process, in an embodiment.

FIG. 24 schematically illustrates a defect analysis system 2400 for a semiconductor lithographic process. System 2400 includes a main control unit 2402, EIAD 102, GUI 116 and a printer 2414. Main control unit 2402 includes a processor 2404, memory 2406, a storage device 2408 and an input/output interface 2412. Storage device 2408 may represent any type of non-volatile storage media, such as any one or more selected from the group consisting of a hard drive, an optical drive, and Flash memory.

Processor 2404 may represent one or more processing units and/or processing cores that execute at least part of software 2410 from memory 2406. Software 2410 comprises machine readable instructions for performing the inspection and defect analysis methods herein described. Memory 2406 may represent any type of random access memory (RAM) that is accessible by processor 2404. Although shown within main control unit 2402, storage device 2408 may be located external to, and in communication with, main control unit 2402, without departing from the scope hereof. Input/output interface 2412 provides connectivity between processor 2404, memory 2406 and/or storage device 2408 and one or more of EIAD 102, GUI 116 and printer 2414.

Storage device 2408 stores software 2410 that includes instructions, executable by processor 2404 when loaded at least in part into RAM memory 2406, for performing functionality of at least part of each of reference pattern generator 106, inspection unit 108 and statistical analyzer 112. Software 2410 is illustratively shown is dashed outline within memory 2406. At least portions of reference pattern 107, and of an image acquired by image acquisition device 102, will reside in RAM memory 2406 while the inspection and defect analysis herein described is performed.

Main control unit 2402 may represent a personal computer and/or a server computer that is loaded with software 2410 to perform certain functionality of system 100, FIG. 1.

Figure 2:
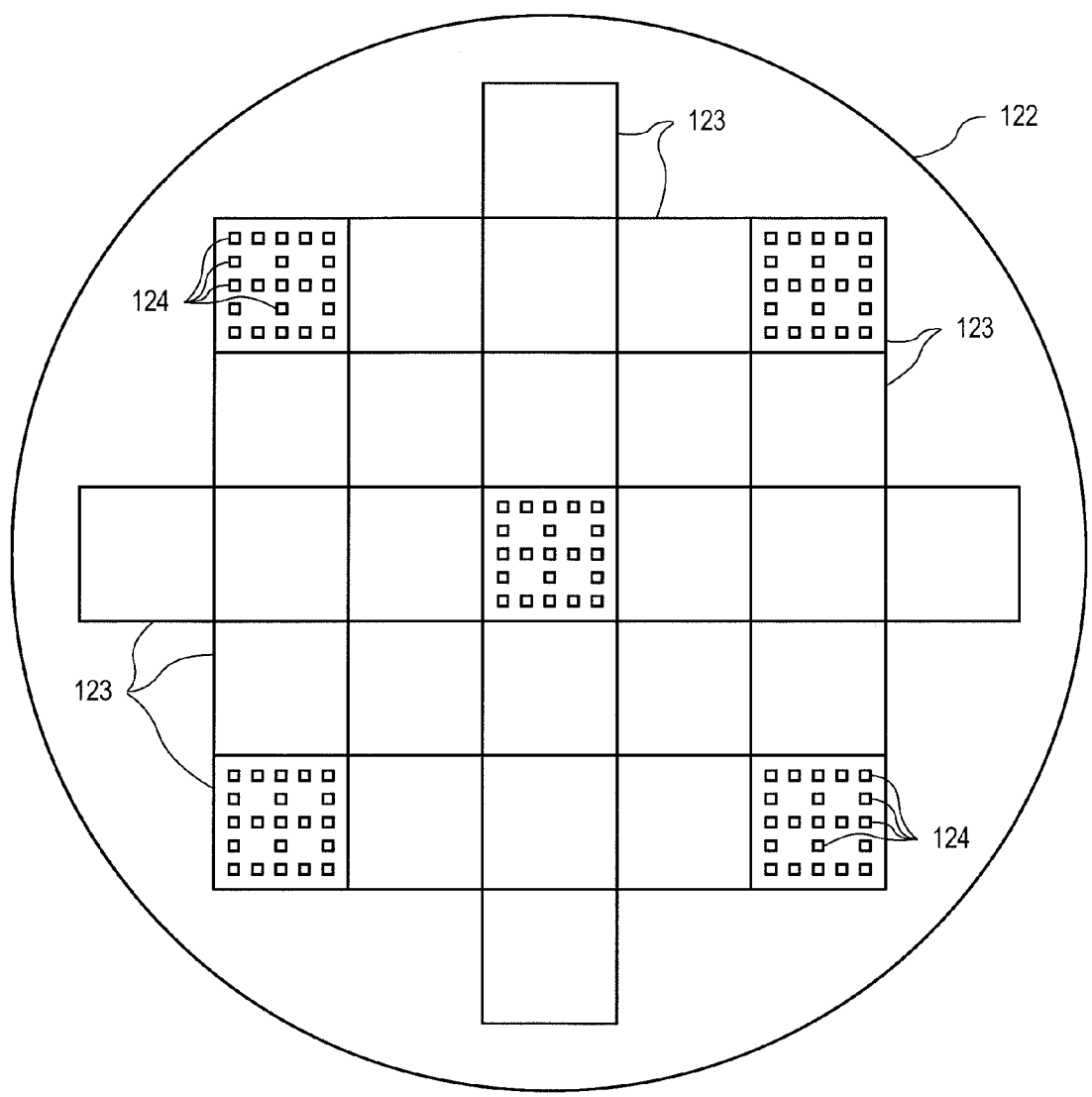
FIG. 2 shows the wafer of FIG. 1 having twenty-nine shots, five of which each have twenty-one inspection regions.

FIG. 2 shows wafer 122 of FIG. 1 having twenty-nine shots 123, wherein five selected shots each have twenty-one inspection regions 124. Inspection regions 124 may be elements of die, or may be elements of test patterns located in scribelines. Since hundreds of measurements may be made within each inspection region, statistical analysis of these measurements provide a substantially more accurate representation of the fabrication process of wafer 122 than can be determined from individual measurements made by prior art CD-SEM. In the prior art, CD-SEM inspection operators typically make five measurements of a pattern in each of five shots on a wafer, and these twenty-five measurements are used to indicate quality of the entire wafer. The greater number of inspection regions, and the greater the number of measurements taken and analyzed, the greater the quality of the result and the greater opportunity to determine skew of parameters across a wafer as well as mean values and standard deviations.

Figure 3:
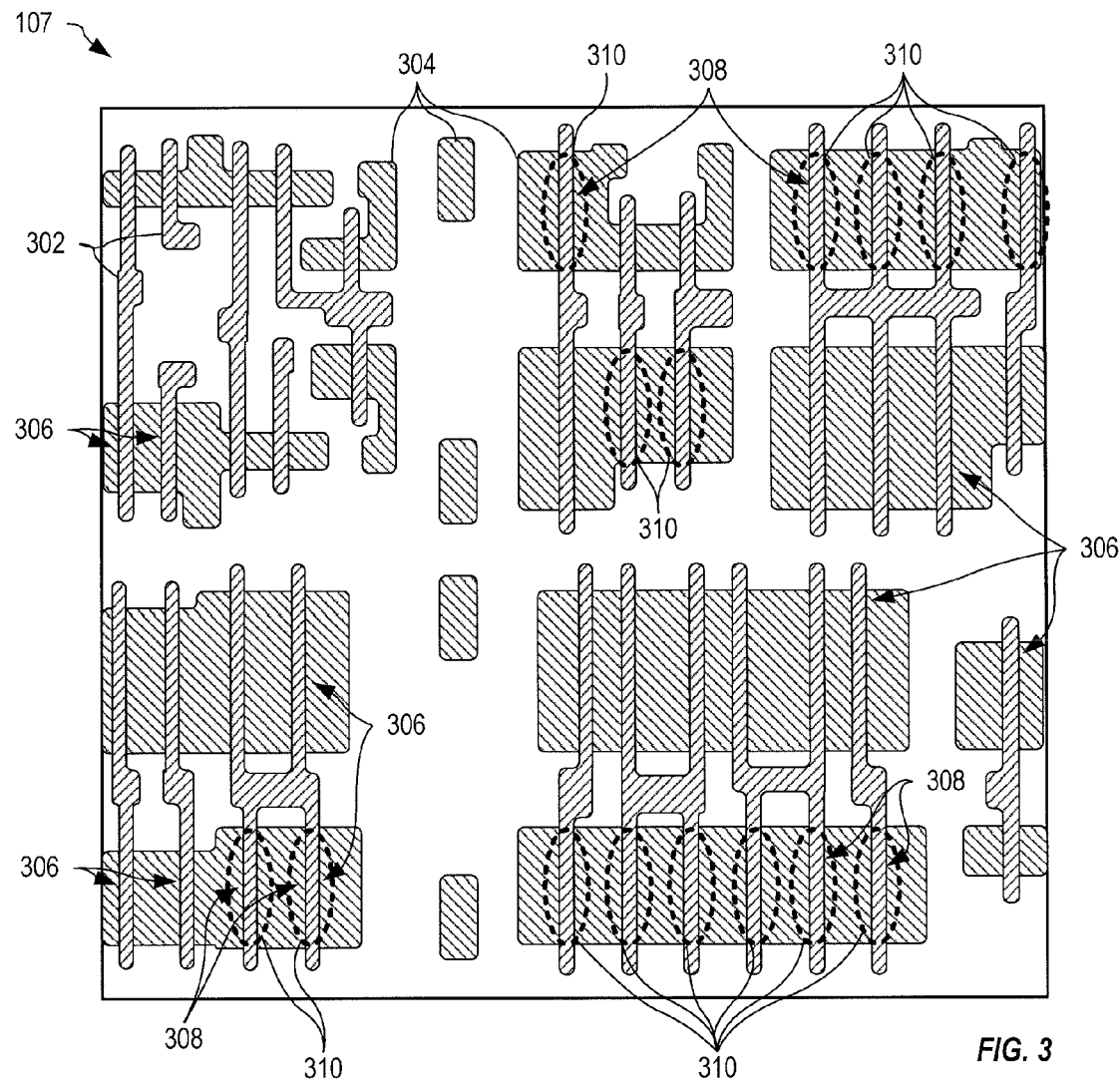
FIG. 3 is a schematic showing exemplary detail of the reference pattern of FIG. 1 as generated for the inspection region.

FIG. 3 is a layout diagram showing exemplary detail of reference pattern 107 generated for one inspection region 124. Where each shot 123 of wafer 122 is fabricated to have identical circuitry, reference pattern 107 may represent one or more of inspection regions 124, as shown in FIGS. 1 and 2. Reference pattern 107 is shown with two patterned layers 302 and 304 that may represent one or more of polysilicon gate and active N or P type layers formed on wafer 122. Where layers 302 and 304 overlap, gate oxides 306 are typically formed on wafer 122.

Within reference pattern 107, a plurality of patterns 308 (e.g., gates) are selected for analysis, as indicated by the dashed oval 310. Selection of patterns 308 may be made automatically based upon the type of wafer analysis to be performed. Further detail on pattern selection is provided below.

Figure 4:
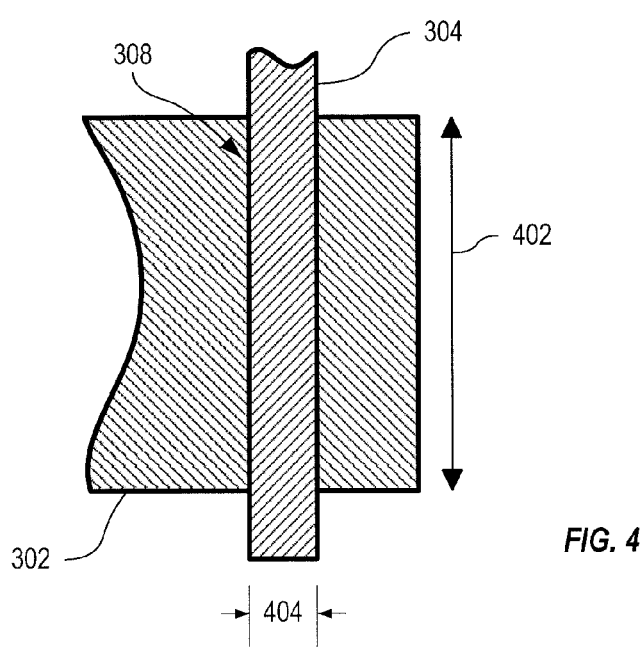
FIG. 4 shows exemplary width and length measurements of the reference pattern of FIG. 3.

Line widths of the patterns within each inspection region are determined. FIG. 4 shows exemplary width 404 and length 402 measurements of pattern 308 of reference pattern 107 formed from layers 302 and 304. Based upon reference pattern 107, patterns within image 103 are automatically registered and measured based upon detected edges. A gate width is, for example, typically 45 nm, and since inspection region 124 covers an area greater than 1 $\mu m^2$, a large number of such gates are typically fabricated within inspection region 124. Selecting, and measuring such a large number of gates is not practically feasible without automatic registration (and optional selection).

More specifically, it is necessary to obtain measurements of line widths of patterns within numerous inspection regions of numerous shots distributed over the wafer, as illustrated in FIG. 2. Although inspection regions are shown arranged in an even distribution within each shot, and an even shot selection is shown, inspection regions may be assigned to areas that are more vulnerable to variation in process conditions, thereby providing greater determination of fabrication process performance. For example, previously collected data may indicate areas more vulnerable to process variation, and thereby allow inspection unit 108 to automatically select inspection regions 124 based upon previously detected faults.

Figure 5A:
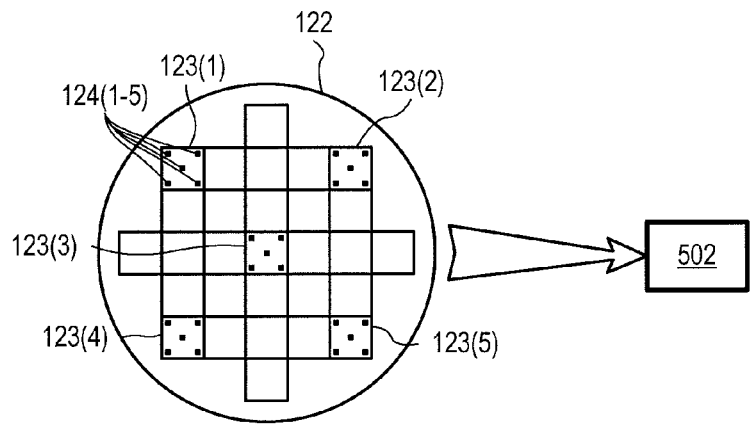
FIG. 5A graphically illustrates processing of pattern measurements of five inspection regions in each of five shots of the wafer of FIG. 1 to produce a statistic indicative of overall fabrication process quality of the wafer.

FIG. 5A graphically illustrates processing of pattern measurements (e.g., gate width measurements) of five inspection regions 124(1-5) in each of five shots 123(1-5) of wafer 122 to produce a statistic 502 indicative of overall fabrication process quality of wafer 122. Inspection unit 108 determines measurements for each inspection region 124(1-5) in each shot 123(1-5) of wafer 122 and statistical analyzer 112 processes these measurements to generate measurement statistics 502. Since measurement statistics 502 includes processed measurement data from shots 123 across wafer 122, measurement statistics 502 are indicative of overall fabrication process quality of wafer 122.

Figure 5B:
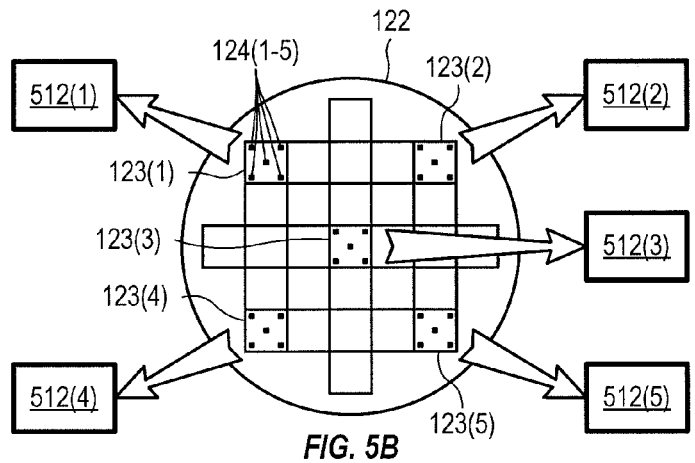
FIG. 5B graphically illustrates processing of pattern measurements for five inspection regions in each of five shots of the wafer of FIG. 1 to produce statistics indicative of fabrication process quality of each shot.

FIG. 5B graphically illustrates processing of pattern measurements (e.g., gate width measurements) for five inspection regions 124(1-5) in each of five shots 123(1-5) of wafer 122 to produce statistics 512(1-5), where each statistic 512 is indicative of fabrication process quality of shots 123(1-5), respectively. That is, for each shot 123(1-5), inspection unit 108 determines measurements for each inspection region 124 (1-5) and statistical analyzer 112 processes these measurements to generate statistics 512(1-5), respectively. Each group of statistics 512(1-5) may then be compared to determine differences in fabrication process quality across wafer 122. Further, statistics 512(1-5) may also be compared to overall wafer measurement statistic 502.

Figure 5C:
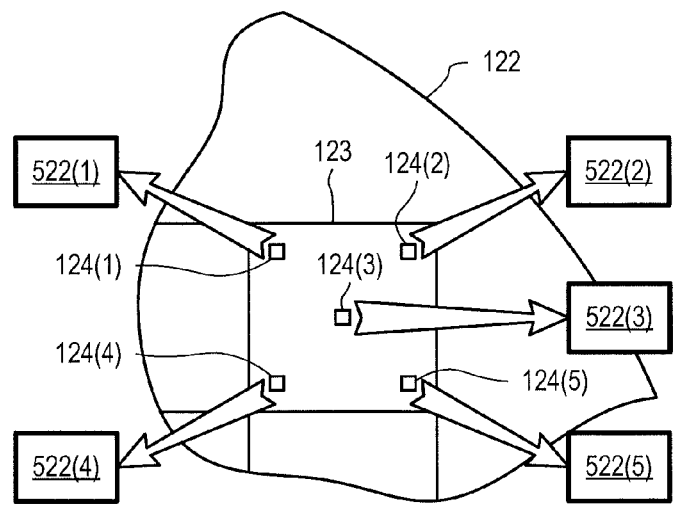
FIG. 5C graphically illustrates processing of pattern measurements for five inspection regions within one shot of the wafer of FIG. 1 to produce statistics indicative of fabrication process quality across the shot.

FIG. 5C graphically illustrates processing of pattern measurements (e.g., gate width measurements) for five inspection regions 124(1-5) within shot 123 of wafer 122 to produce statistics 522(1-5), where each statistic 522 is indicative of fabrication process quality across shot 123. That is, for shot 123, inspection unit 108 determines measurements for each inspection region 124(1-5) and statistical analyzer 112 processes these measurements to generate statistic 522(1-5). Each statistic 522(1-5) may then be compared to determine differences and/or variation in fabrication process quality across shot 123. Further, statistics 522(1-5) may also be compared to statistic 512 associated with shot 123.

Where measurements are of line width, tendency in variation of line width may be further analyzed to identify variation tendency across the wafer, and/or within each shot. Although five shots 123 are shown selected, more or fewer shots may be selected, without departing from the scope hereof. Although five inspection regions 124 are shown within each selected shot, more or fewer inspection regions may be used without departing from the scope hereof.

Classification of Measurements Based Upon Design Data Characteristics

Variations in measured line width may include various components of independent variations. A variation may be related to measured line widths of a first set of patterns having the same design width. Another variation may be related to measured line widths of a second set of patterns having the same design width, which is different from the design width of the first set of patterns. To assess and control the fabrication processes sufficiently, line width measurements for numerous different design line widths are measured and analyzed. Further, other pattern characteristics, based upon the associated design data, affect fabricated line widths of the patterns. Thus, classification of measurements may be based upon design data characteristics for one or more of: pattern direction, kinds of pattern, space between patterns, types of adjacent patterns, and density of adjacent patterns. The line width measurements are sorted, based upon one or more of the associated design data characteristics and then statistically analyzed for trends in variation of line width.

In an embodiment, measured line widths for patterns associated with a range of design data line widths may be analyzed to determine an evaluation of the fabrication process. For example, a first statistical analysis of measured line widths may be made for measurements having an associated design data line width in the range from 30 nm to 32 nm, a second statistical analysis may be made for measurements having an associated design data line width in the range from 32 nm to 34 nm, and so on.

In the prior art, where distributions corresponding to different design line width values are merged, the accuracy of the resulting statistic deteriorates. To prevent such accuracy deterioration, differences between the measured line widths and the line width defined within the associated design data are used to form the statistic, thereby allowing statistics to be combined without deterioration.

Further classification of line width measurements may be based upon a direction of the pattern as defined within the associated design data. Typically, within the design data, horizontal and vertical directions are used for gates, with diagonal and curved gates often avoided, although other directions may be used in some designs. Measurements selected for statistical analysis may be based upon one or more defined line directions, including, but not limited to, horizontal, vertical, and directions in multiples of 45 degrees.

Further classification of line width measurement may be based upon an associated gate type within the design data. For example, where measured line widths correspond to a gate defined within the design data, the associated gate type (e.g., P-type and N-type) may be used to further classify the line width measurements prior to statistical analysis. The generated statistics thereby providing insight into fabrication processes that may differ in some ways for each gate type.

Further classification of measured line widths may be made by determining, from associated design data, a width between the measured pattern and patterns formed adjacent to the measured pattern.

FIG. 6 is a schematic diagram showing a first portion 600 of design data 126 that includes a pattern 602 and its two adjacent patterns 604 and 606. Pattern 602 has a defined width 608 and has a defined space distance 610 from pattern 604 and a defined space distance 612 from pattern 606. FIG. 7 is a schematic diagram showing a second portion 700 of design data 126 that includes a pattern 702 and its two adjacent patterns 704 and 706. Pattern 702 has a defined width 708 and is spaced a distance 710 from pattern 704 and a distance 712 from pattern 706. Patterns 602, 604, 606, 702, 704 and 706 may represent design data for gates to be formed on a wafer during fabrication of the design data. Prior to statistical analysis of width measurements of patterns 602 and 702 fabricated on wafer 122, these width measurements may also be classified based upon spacing around the pattern (i.e., distances 610, 612, and 710, 712, respectively).

In one example of operation, defined width 608 is classified based upon one or more of a sum, an average and a minimum of space distances 610 and 612, and defined width 708 is classified based upon one or more of a sum, an average and a minimum, of space distances 710 and 712. By grouping measured widths based upon these classifications, statistics may be generated for ranges of pattern spacing, such that these statistics show greater detail for each pattern spacing range, unlike the prior art where spacing is not taken into account, resulting in less meaningful (blurred) statistics. This is of particular significance for wafer fabrication processes, since pattern spacing results in significant variation in resulting pattern widths. By analyzing pattern widths based upon pattern spacing, greater understanding (and hence control) of fabrication processes is possible. Further, direction of spaces relative to measured patterns may also be used to classify measured widths prior to statistical analysis.

An alternative classification of measured pattern widths may be made based upon densities of patterns in areas adjacent to the measured pattern. Pattern density of an area may be determined by the equation:

Pattern Density=Area of Patterns in Neighboring Region/Area of Neighboring Region Thus, rather than determining spaces, and space directions around the measured pattern, the density of patterns around the measured pattern may be used to provide an alternative classification. FIG. 8 graphically shows two exemplary layers 804, 806, in a portion 800 of design data 126. A width measurement of the pattern associated with first gate 802 is classified by evaluating the density of patterns within a neighboring region 808 surrounding gate 802. Similarly, a pattern density is determined for a second gate 822 based upon a neighboring region 828 surrounding gate 822. As shown, region 808 has a higher pattern density than region 828, such that measured widths of gates 802 and 822 are classified differently. In one embodiment, ranges of pattern density are used in a similar manner to ranges of the pattern line widths to classify measured patterns prior to statistical analysis.

Measurements are automatically determined for each inspection region, classified and then analyzed to generate one or more different types of statistic. That is, patterns may be automatically selected from design data 126 based upon classification criteria, such that system 100 may automatically image and measure, classify and analyze the patterns to generate appropriate data for control of fabrication processes. Although averaging is a common statistical analysis used to analyze measurements, other statistics, such as standard deviation, maximum value, and minimum value, may be generated. In the prior art, where CD-SEM is used to perform a measurement within each inspection region, the limited number of measurements inhibits the generation of meaningful statistics. For example, using CD-SEM to measure singular values within each of five inspection regions within each of five selected shots on a wafer provides only twenty-five measurement values from the wafer, and thus obtained statistical information is of limited value.

A variation in any one process condition of the wafer fabrication may cause large variations in an average of line widths measured over the wafer and small variations in a standard deviation of those measurements. On the other hand, a variation in another process condition of the wafer fabrication may cause small variations in an average of line widths measured across the wafer and large variations in a standard deviation of those measurements. Thus, by comparing both average and standard deviation statistics of the measurements, clues to causes of the variation in the process condition may be identified.

Although the examples shown herein utilize a plurality of inspection regions located within a plurality of shots on the wafer, a plurality of inspection regions within a plurality of dies may also be used without departing from the scope hereof. Also, although the examples herein utilize a line width of patterns formed on the wafer, other measurements may also be used without departing from the scope hereof. For example, any one or more of average line width, space width, and average space width of line-shaped patterns may be used, where, in the above examples, the line width and the space width are transposed.

Figure 9:
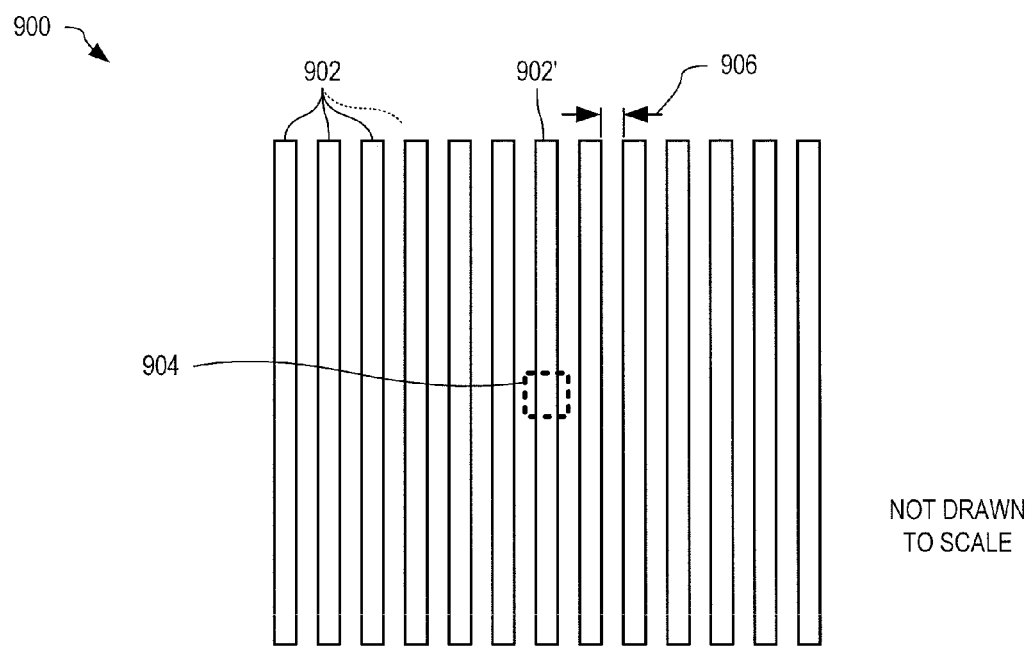
FIG. 9 shows one exemplary inspection region containing test patterns formed on a wafer with defined pattern spacing.

To evaluate the effects of pattern spacing on a particular fabrication processes, patterns are formed onto the wafer in a plurality of test regions, where pattern spacing within each region is one of 120 nm, 110 nm, 100 nm, 90 nm, 80 nm, 70 nm, and 60 nm. FIG. 9 shows one exemplary inspection region 900 containing patterns 902 formed on the wafer with a spacing 906. A width of pattern 902' is measured within a central part of inspection region 900, as indicated by square 904. Inspection region 900 is substantially square, having an area of 36 $\mu m^2$ (i.e., having sides of approximately 6 $\mu m$). Patterns 902 have a design width of 70 nm within each test region. Thus, each inspection region 900 contains between 31 and 46 patterns 902.

Figure 10:
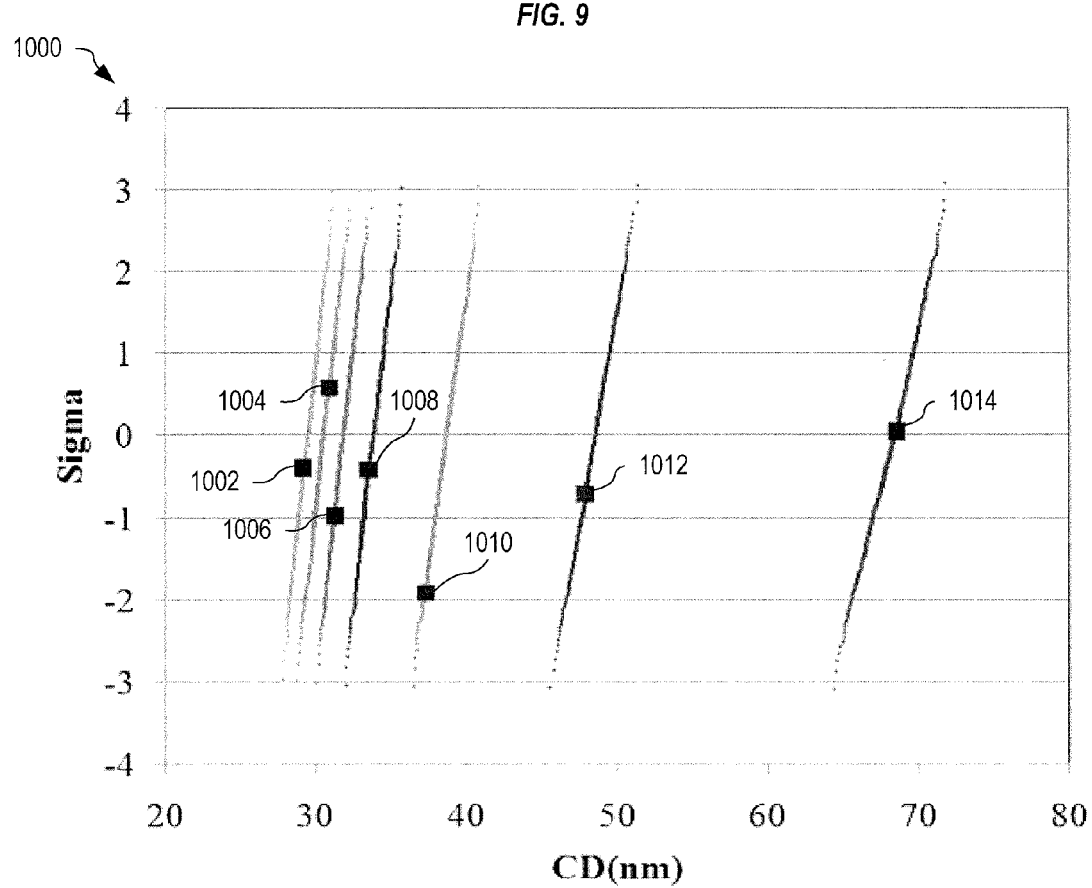
FIG. 10 is a normal probability plot of a distribution of measured line widths for the test patterns of FIG. 9 formed for each of the seven pattern spacing values 120 nm, 110 nm, 100 nm, 90 nm, 80 nm, 70 nm, and 60 nm.

FIG. 10 is a normal probability plot 1000 of a distribution of measured line widths (within square 904) for patterns 902', FIG. 9, formed within inspection region 900 for each of the seven pattern spacing values 120 nm, 110 nm, 100 nm, 90 nm, 80 nm, 70 nm, and 60 nm. The horizontal axis of plot 1000 represents the measured line width, and the vertical axis represents a standard deviation.

A point 1002 represents a measured width of pattern 902' within inspection region 900 for the pattern spacing of 120 nm, and plotted points extending therefrom represent other pattern width measurements within inspection region 900 for the same pattern spacing and having a standard deviation of 0.59 nm.

A point 1004 represents a measured width of pattern 902' within inspection region 900 for the pattern spacing of 110 nm, and plotted points extending therefrom represent other pattern width measurements within inspection region 900 for the same pattern spacing and having a standard deviation of 0.61 nm.

A point 1006 represents a measured width of pattern 902' within inspection region 900 for the pattern spacing of 100 nm, and plotted points extending therefrom represent other pattern width measurements within inspection region 900 for the same pattern spacing and having a standard deviation of 0.60 nm.

A point 1008 represents a measured width of pattern 902' within inspection region 900 for the pattern spacing of 90 nm, and plotted points extending therefrom represent other pattern width measurements within inspection region 900 for the same pattern spacing and having a standard deviation of 0.65 nm.

A point 1010 represents a measured width of pattern 902' within inspection region 900 for the pattern spacing of 80 nm, and plotted points extending therefrom represent other pattern width measurements within inspection region 900 for the same pattern spacing and having a standard deviation of 0.75 nm.

A point 1012 represents a measured width of pattern 902' within inspection region 900 for the pattern spacing of 70 nm, and plotted points extending therefrom represent other pattern width measurements within inspection region 900 for the same pattern spacing and having a standard deviation of 0.94 nm.

A point 1014 represents a measured width of pattern 902' within inspection region 900 for the pattern spacing of 60 nm, and plotted points extending therefrom represent other pattern width measurements within inspection region 900 for the same pattern spacing and having a standard deviation of 1.31 nm.

Figure 11:
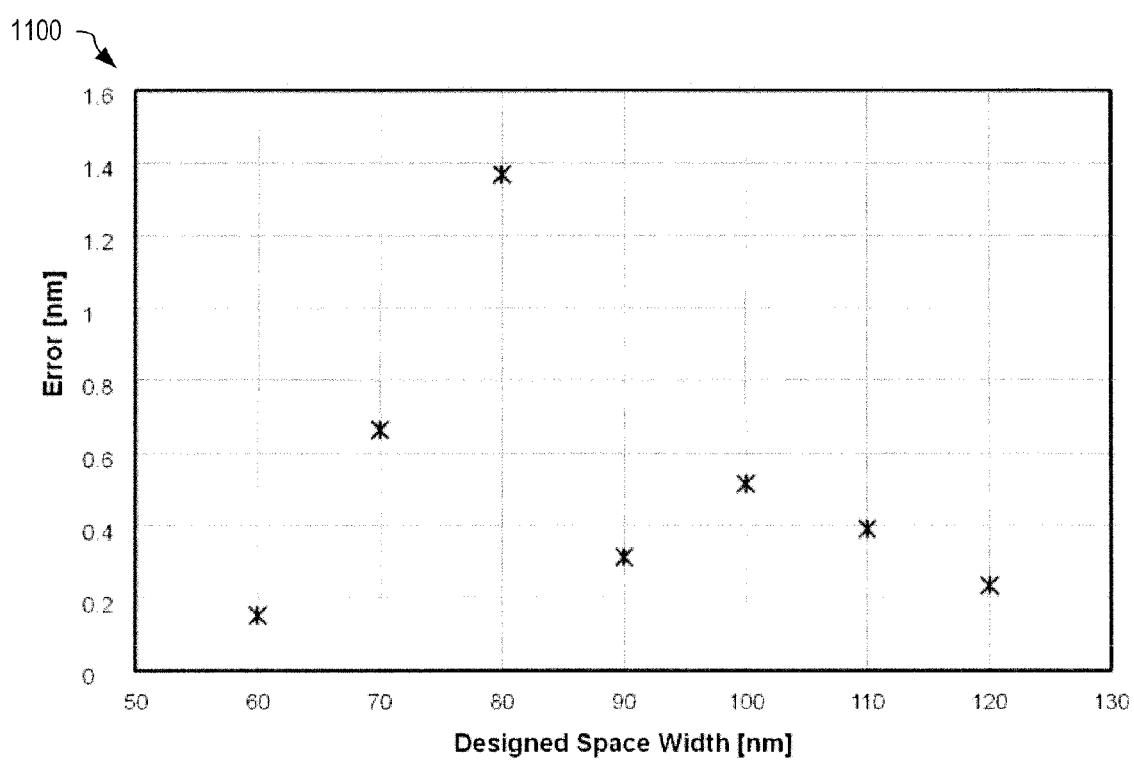
FIG. 11 shows a graph plotting line width error against designed space width for each test region having designed pattern spacing of 60 nm, 70 nm, 80 nm, 90 nm, 100 nm, 110 nm, and 120 nm.

FIG. 11 shows a graph 1100 plotting line width error against designed space width for each central part (e.g., square 904, FIG. 9) of inspection regions (e.g., inspection region 900) for each test region having designed pattern spacing of 60 nm, 70 nm, 80 nm, 90 nm, 100 nm, 110 nm, and 120 nm. Of note, the absolute values of differences disperse without correlation to the space width, and the errors of the measured line widths obtained from central parts (e.g., square 904) of inspection regions 900 are larger than the average of the error values of the distributions of measurements of line widths for each of the tested pattern spacing values.

Figure 12:
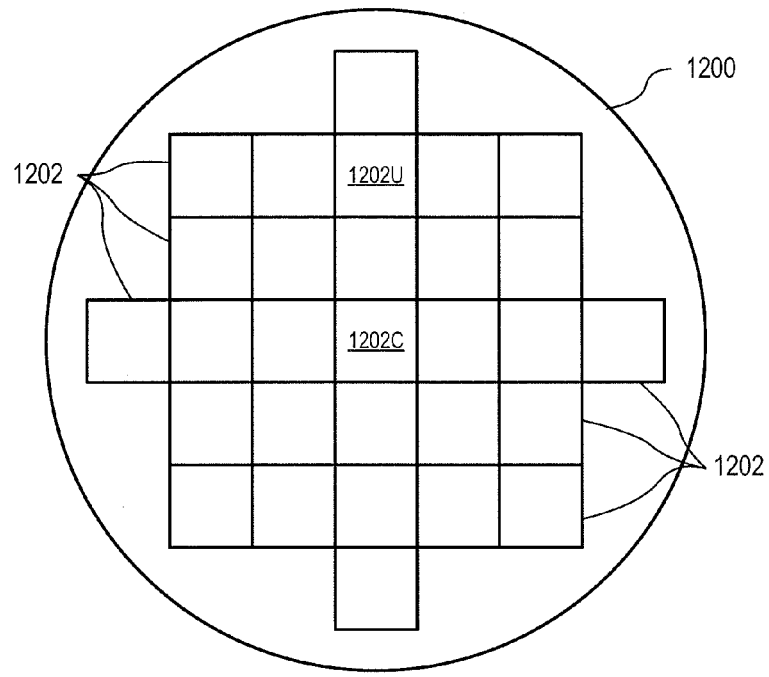
FIG. 12 shows one exemplary wafer having a plurality of shots fabricated using substantially the same fabrication parameters (conditions).
Figure 13:
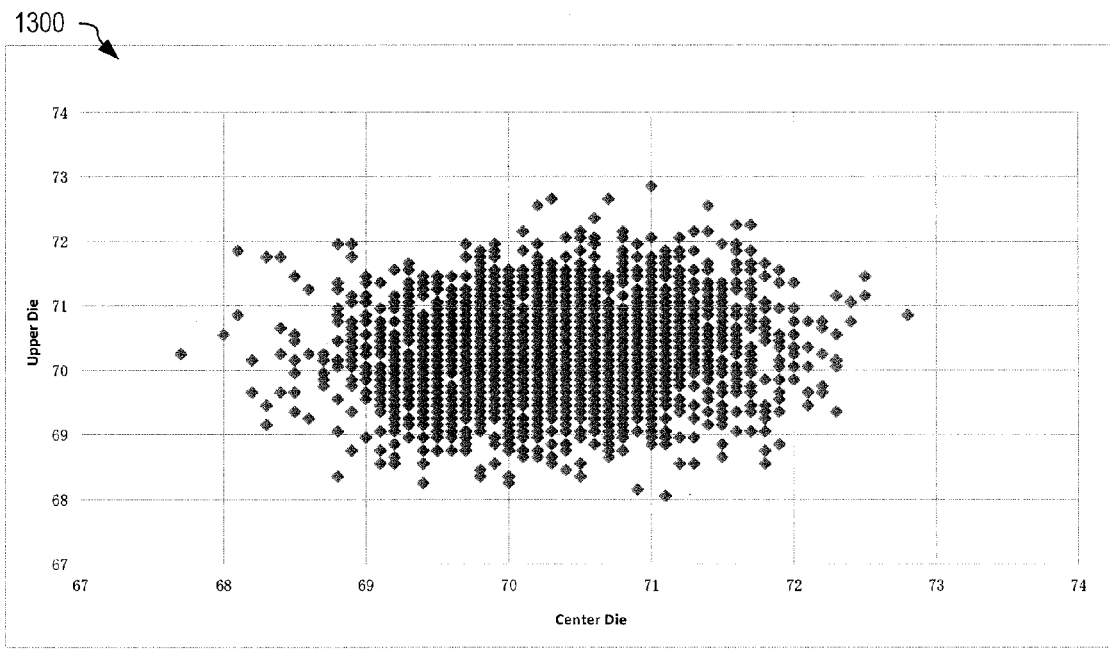
FIG. 13 is a graph illustrating poor or no correlation between measurements of corresponding patterns within an upper shot and a center shot of the wafer of FIG. 12.

FIG. 12 shows one exemplary wafer 1200 having a plurality of shots 1202 fabricated using substantially the same fabrication parameters (conditions). Measured line widths of patterns formed within an upper shot 1202U and measured line widths of corresponding patterns formed in a center shot 1202C are compared to show variation across wafer 1200. FIG. 13 is a graph 1300 illustrating poor or no correlation between measurements of corresponding patterns within upper shot 1202U and center shot 1202C. The horizontal axis represents a line width measurement of a set of patterns in the center shot 1202C and the vertical axis represents a line width measurement of the same set of patterns (in the same position) within upper shot 1202U, and plotted as a diamond. The patterns formed within each shot 1202, and used in the measurements plotted in FIG. 13, have a design width of 70 nm and a design spacing of 60 nm. Since there is poor or no correlation between measurements of corresponding sets of patterns within upper shot 1202U and center shot 1202C, standard deviation of the distribution is large, as seen in FIG. 13. The fabrication quality of the formed patterns within upper shot 1202U and center shot 1202C cannot be adequately evaluated through line width measurement and analysis of corresponding patterns. On the contrary, a difference of average line width measurements of these patterns is drastically smaller than each difference in the corresponding line width measurements. Thus, the average line width measurements are more suitable to assess and control the fabrication processes than the measurements of corresponding sets of patterns.

Figure 14:
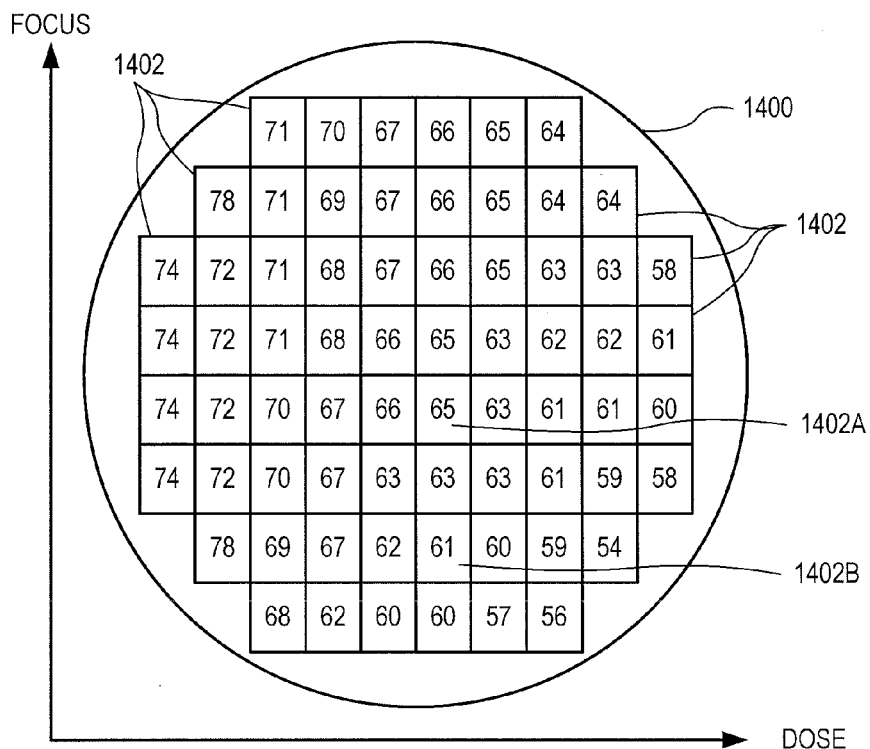
FIG. 14 shows a distribution of average line width measurements of patterns within each shot of a test wafer.
Figure 15:
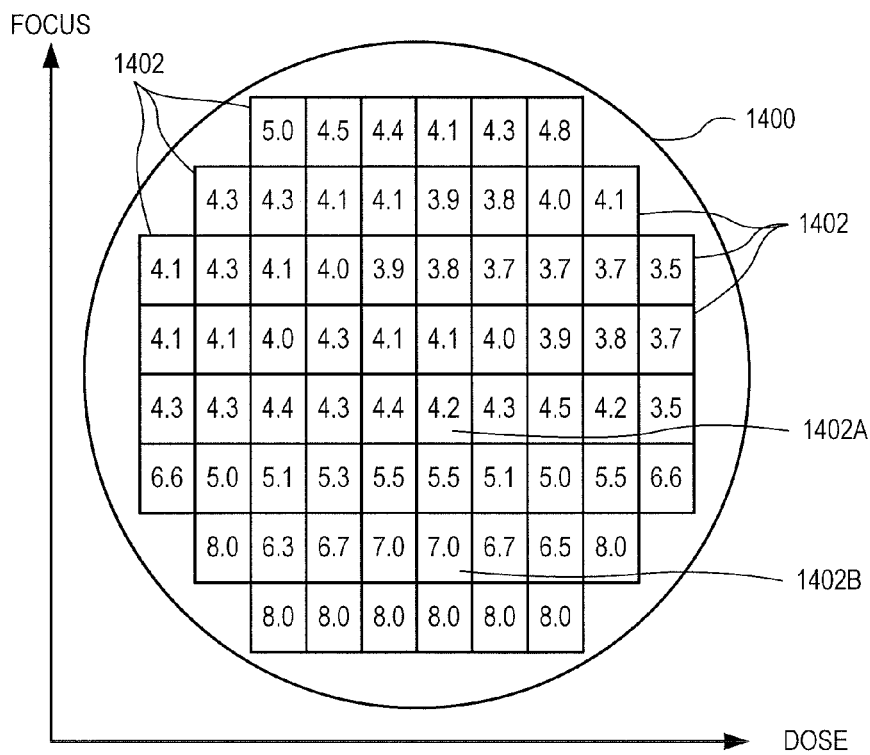
FIG. 15 shows distribution of standard deviation of line width measurements of patterns formed within each shot of the test wafer of FIG. 14.

FIG. 14 shows a distribution of average line width measurements of patterns within each shot of a test wafer 1400. FIG. 15 shows distribution of standard deviation of line width measurements of patterns formed within each shot of test wafer 1400. Test wafer 1400 is fabricated with a plurality of shots, where focus is varied in a vertical direction for each shot, and dose is varied in a horizontal direction for each shot. Thus, each fabricated shot has differing focus and dose conditions. The patterns formed within each shot have consistent design line width and design spacing. FIG. 14 and FIG. 15 are derived from the same line width measurements of corresponding patterns within each shot on the same wafer. As shown in FIG. 14, the average of line width measurements of a shot 1402A is not particularly different from the average of line width measurements of a shot 1402B. However, as shown in FIG. 15, there is a clear difference in the standard deviation of the line width measurements between shots 1402A and 1402B. Thus, where an evaluation of fabrication process conditions is performed using only average values of measured line widths within multiple shots across a wafer, results may not indicate process anomalies, resulting in an undetected inferior semiconductor device. On the other hand, an evaluation using a standard deviation of the line width measurement values would clearly indicate the inferior process conditions.

Accordingly, as shown in FIGS. 14 and 15, by measuring line widths of patterns formed within shots on a wafer, an evaluation of the wafer fabrication process may be statistically determined. System 100, FIG. 1, automatically registers inspection regions (e.g., inspection regions 124, FIGS. 1 and 2, and inspection regions 900, FIG. 9), where each inspection region has an area greater than, or equal to, 1 $\mu m^2$. Registration of an inspection region requires locating the region on the wafer, capturing at least one image of that area of the wafer to form an image of the inspection region and then aligning the captured features in the image with associated features in reference geometry generated from associated design data. Automatic registration of each inspection region is necessary since one or more inspection regions are registered within one or more shots of a wafer, and therefore, the number of inspection regions to be registered may be large, wherein manual registration would require an inordinate amount of time and make measurement and analysis impractical.

The average of a plurality of measurements is made within each inspection region, and results in a more accurate representation of pattern line width as compared to single measurements. The average of the line width measurement allows process conditions to be controlled more accurately, and cause of process condition variation may be further identified through statistical analysis (e.g., standard deviation, maximum, and minimum) of the measured line widths.

In particular, the inspection regions may be automatically selected for shots across the wafer such that variation in process conditions across the wafer may be determined upon analysis of measurements made within each inspection region, wherein statistical analysis of the measurements may indicate unwanted process variation across the wafer.

Line width measurements may be classified and/or sorted prior to statistical analysis to isolate statistical variation for different process conditions. Thus, variation within the process conditions may be identified through statistical analysis of the classified and/or sorted measurement values.

Method of Controlling Variations in Individual Line Widths of Patterns

Using the above systems and methods, during fabrication of a wafer, statistics may be obtained from line width measurements of patterns of a semiconductor device before a fabrication process (e.g., an etch process), and statistics are obtained from measurements of the patterns of the same semiconductor device after the fabrication process. However, the statistics obtained from the line width measurements made after the fabrication process are indicative of performance of the semiconductor device, and not necessarily of the fabrication process, since variation in gate widths, for example, may have been introduced in a prior fabrication process. In particular, statistics derived from the measurements made after the fabrication process contain (i) a component of features existing prior to the fabrication process and (ii) a component of the effect of the fabrication process. To improve evaluation of the fabrication process, it is desirable to remove the component of features existing prior to the fabrication process, thereby allowing better control of the fabrication process.

Figure 16:
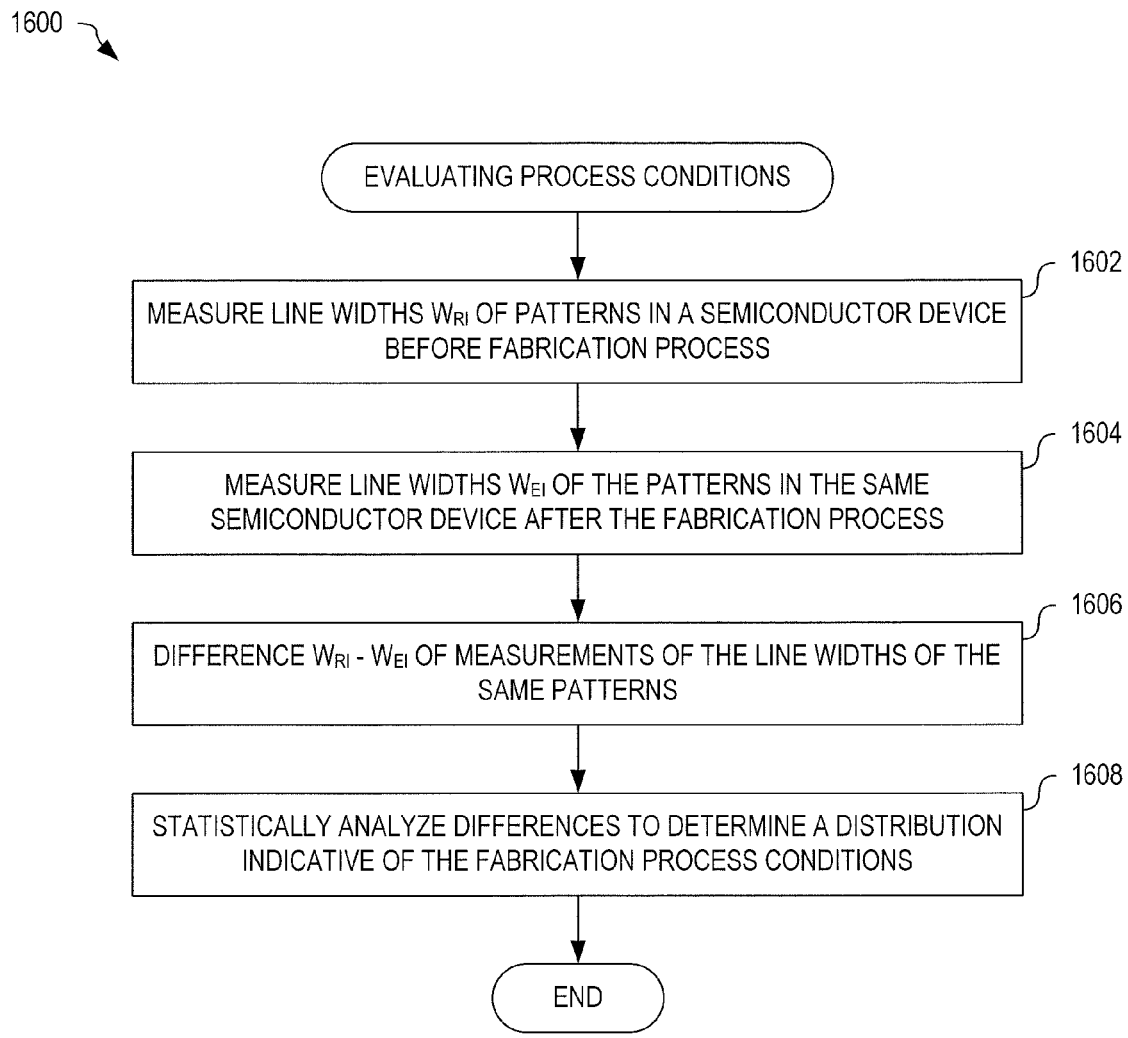
FIG. 16 is a flowchart illustrating one exemplary process for evaluating fabrication process condition.

FIG. 16 is a flowchart illustrating one exemplary process 1600 for evaluating fabrication process condition. Process 1600 is for example implemented within one or both of inspection unit 108 and statistical analyzer 112 of system 100, FIG. 1.

In step 1602, process 1600 measures line widths $W_{Ri}$ of patterns within an inspection region of a semiconductor device before a fabrication process. In one example of step 1602, inspection unit 108 analyzes pattern width measurements 109 generated from at least one inspection region 124, located on a semiconductor device on wafer 122, prior to an etch process that forms part of lithographic process 120 of wafer 122. Each measurement 109 is associated with a location i of $W_{Ri}$.

In step 1604, process 1600 measures line widths $W_{Ei}$ of the patterns within the inspection region of the same semiconductor device after the fabrication process. In one example of step 1604, inspection unit 108 analyzes pattern width measurements 109 generated from the at least one inspection region 124, located on the semiconductor device on wafer 122, after the etch process. Each measurement 109 is associated with the same location i. as in step 1602.

In step 1606, process 1600 calculates the difference $W_{Ri}$–$W_{Ei}$ for the measurement sets captured in steps 1602 and 1604. In one example of step 1606, inspection unit 108 calculates a difference between measurements made prior to the fabrication process and measurements made after the fabrication process for each location i for the semiconductor.

In step 1608, process 1600 statistically analyzed the differences of step 1606 to determine a distribution indicative of the fabrication process conditions. In one example of step 1608, statistical analyzer 112 processes the determined differences $W_{Ri}$–$W_{Ei}$ and generates statistical data 113 that may be used to evaluate the etch process and thereby adjust control parameters of any subsequent etch process (e.g., the etch process performed on subsequent wafers).

In particular, by subtracting measurements $W_{Ei}$ after the fabrication process from measurements $W_{Ri}$ prior to the fabrication process, only variation in the distribution resulting from the fabrication process is shown in the generated statistic.

The line width measurements may also be classified and sorted, as described above, prior to the step of differencing, such that only selected measurements are differenced and then statistically analyzed.

Figure 17:
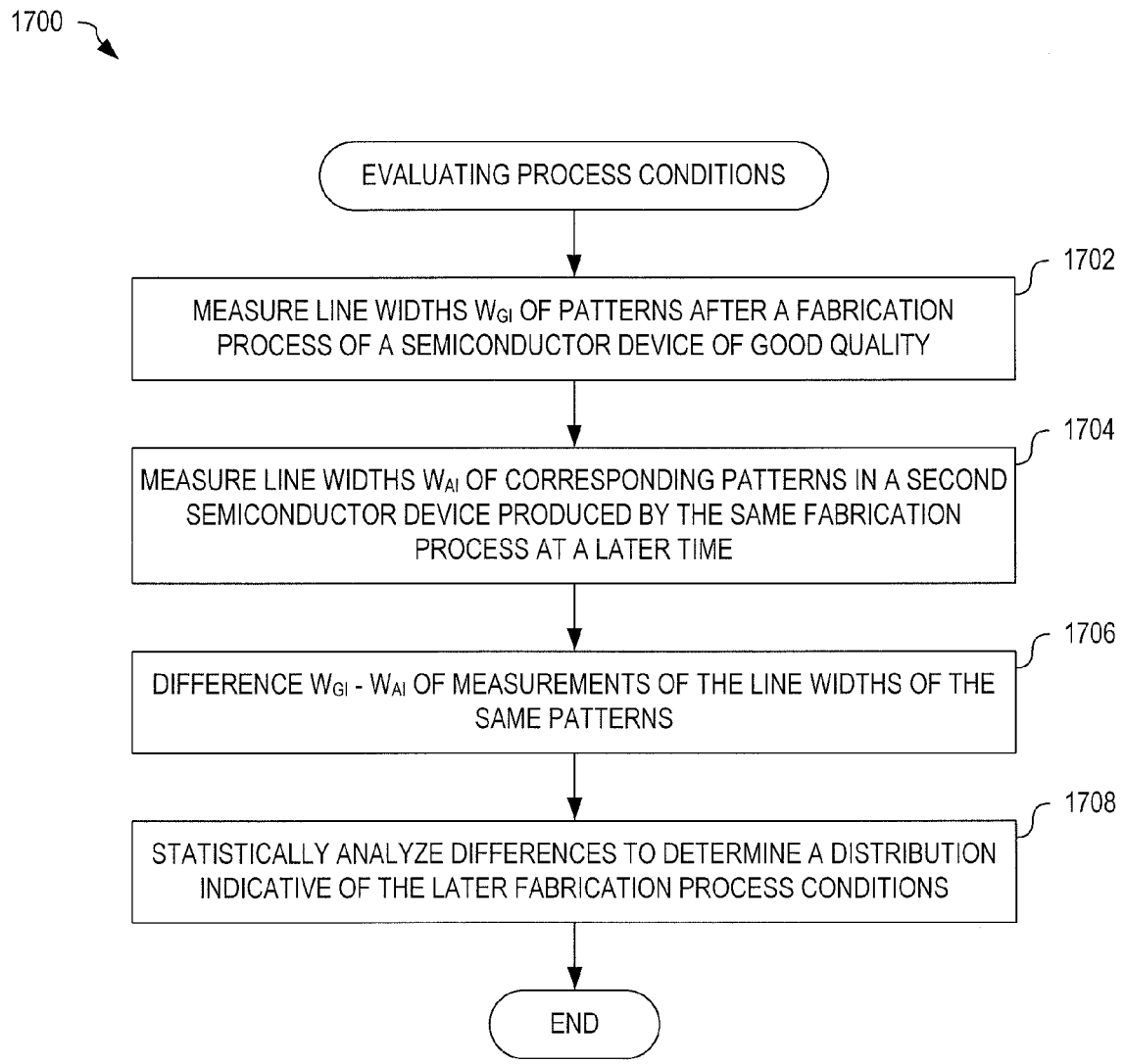
FIG. 17 shows one exemplary process for evaluating a fabrication process by differencing and statistically analyzing line width measurements for a known good quality patterns and patterns produced by substantially the same fabrication process at a later time.

FIG. 17 shows one exemplary process 1700 for evaluating a fabrication process by differencing and statistically analyzing line width measurements for a known good quality patterns and patterns produced by the same fabrication process at a later time. Process 1700 may be implemented within one or both of inspection unit 108 and statistical analyzer 112 of system 100, FIG. 1.

In step 1702, process 1700 measures line widths $W_{Gi}$ of patterns after a fabrication process of a semiconductor device of good quality. In one example of step 1702, inspection unit 108 generates a set of measurements $W_{Gi}$ within one or more inspection regions 124 after an etch process of a semiconductor device, that is determined (e.g., at a later time after complete processing and testing) to be of good quality.

In step 1704, process 1700 measures line widths $W_{Ai}$ of corresponding patterns in a second semiconductor device produced by the same fabrication process at a later time. In one example of step 1704, a wafer containing the same type of semiconductor device produced by the same fabrication process is inspected and a set of measurements $W_{Ai}$ are made for patterns corresponding to the patterns of step 1702. That is, patterns at the same locations within the second semiconductor device as the patterns measured in the semiconductor device that is known to be good.

In step 1706, process 1700 calculates a difference $W_{Gi}$–$W_{Ai}$ of measured line widths of the same patterns. In one example of step 1706, inspection unit 108 generates a measurement set 111 by subtracting set $W_{Ai}$ of step 1702 from set $W_{Gi}$ of step 1704.

In step 1708, process 1700 statistically analyzes the differences to determine a distribution indicative of the later fabrication process conditions. In one example of step 1708, statistical analyzer 112 processes the differences from step 1706 to generate statistical data 113 that indicates variance from the fabrication process of known good quality. In particular, process 1700 generates statistical information that is not based upon variance from design data, but from known good quality results. For example, where a wide wiring pattern of a semiconductor device is fabricated in a different line width from that specified within the design data, the semiconductor may still function correctly. Thus, process 1700 may ignore insignificant variations in the fabrication process from design data, and yet still highlight process condition variations that result in less than good devices.

Smallest Enclosing Rectangle and Maximum Empty Circle

Isolated patterns may be analyzed for selected features, such as by determining a diameter, an area, a length of the periphery, a degree of circularity, a moment, and the like, based upon contours obtained from the image of the feature. However, such analysis is not sufficient where contact holes are selected for inspection and evaluation. Since a contact hole has a different shape from a circle (such as an ellipse or a peanut shape), width and height measurements of these contact holes are insufficient for evaluating fabrication process conditions.

To improve upon this analysis, the obtained contours of contact holes may be used to determine (a) a maximum diameter of a circle that fits within the feature contours (maximum empty circle), and (b) a smallest enclosing rectangle that can contain the feature contours. The measurements obtained for the maximum empty circle and the smallest enclosing rectangle may be used for analyzing fabrication process conditions. In the following example, contact hole features are analyzed to evaluate fabrication processes.

Figure 18:
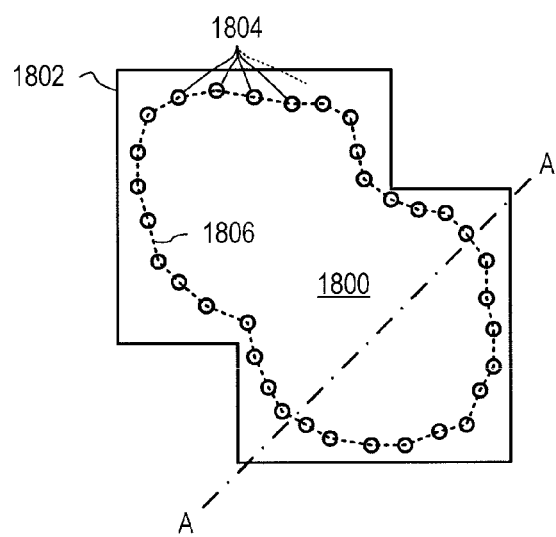
FIG. 18 is a schematic illustrating an exemplary contact hole design data and an exemplary set of detected edges that form a contour for the fabricated contact hole.
Figure 19:
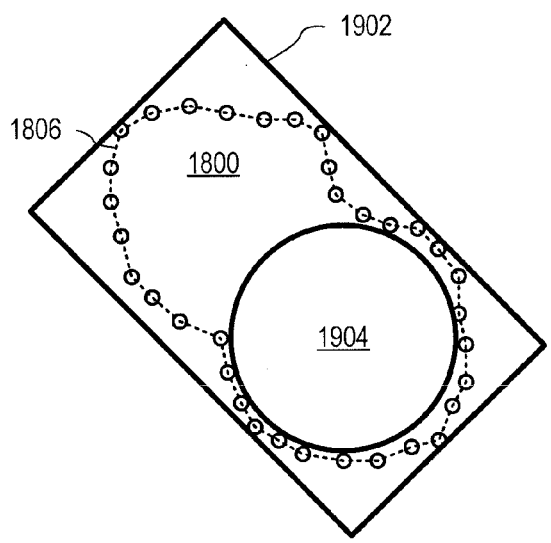
FIG. 19 shows a smallest enclosing rectangle that can be formed around the contour of FIG. 18 and a maximum empty circle that can be formed within the contour.

FIG. 18 is a schematic illustrating an exemplary contact hole design data 1802 and an exemplary set of detected edges 1804 that form a contour 1806 for the fabricated contact hole 1800. Contour 1806 is a polygon formed by connecting detected edges 1804 of contact hole 1800, such that contour 1806 has a shape approximately matching the shape of edges of contact hole 1800. In particular, detected edges 1804 represent second edges of contact hole 1800 detected from an image (e.g., image 103, FIG. 1). FIG. 19 shows a smallest enclosing rectangle 1902 that can be formed around contour 1806 and a maximum empty circle 1904 that can be formed within edge contour 1806. Smallest enclosing rectangle 1902 is a rectangle having the smallest area that includes all vertices of contour 1806. Maximum empty circle 1904 is a circle with the largest radius that can be formed without including a vertex of contour 1806. Smallest enclosing rectangle 1902 and maximum empty circle 1904 may be determined through well known methods of computational geometry.

Where contour 1806 approximates a circle, measurements of smallest enclosing rectangle 1902 and maximum empty circle 1904 have equivalent information. However, where contour 1806 cannot be approximated by a circle, as shown in FIGS. 18 and 19, measurements of smallest enclosing rectangle 1902 and maximum empty circle 1904 may be used to better evaluate fabrication process conditions than simple use of width and height, since the area of smallest enclosing rectangle 1902 may control an area of contact hole 1800 more precisely, even if contact hole 1800 is inclined.

Figure 20A:
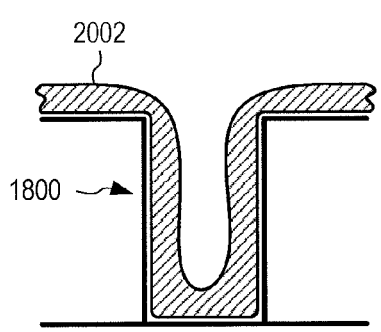
FIG. 20A schematically illustrates a cross section A-A of the contact hole of FIG. 18 where a CVD process deposits a film having a thickness less that the radius of maximum empty circle of FIG. 19.
Figure 20B:
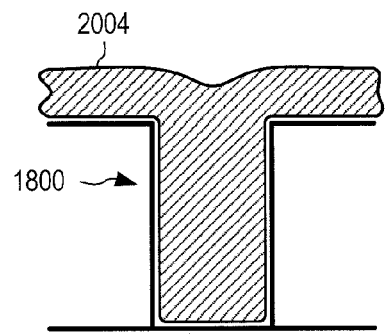
FIG. 20B schematically illustrates a cross section A-A of the contact hole of FIG. 18 where a CVD process deposits a film having a thickness greater than the radius of the maximum empty circle of FIG. 190, resulting in an inferior quality contact hole.

Further, radius of maximum empty circle 1904 may be used to control a following chemical vapor deposition (CVD) process such as may be used for metallization. FIG. 20A schematically illustrates a cross section A-A of contact hole 1800 where a CVD process deposits a film 2002 having a thickness less that the radius of maximum empty circle 1904, resulting in an inferior quality contact. FIG. 20B schematically illustrates a cross section A-A of contact hole 1800 where a CVD process deposits a film 2004 having a thickness greater than or equal to the radius of maximum empty circle 1904. Thus, a CDV process may be controlled by determining the maximum empty circle of contact holes prior to film deposition.

Determined measurements of smallest enclosing rectangle 1902 and maximum empty circle 1904 may be classified and analyzed in a manner similar to the above described gate width measurements for evaluating and controlling fabrication processes. The use of smallest enclosing rectangle 1902 and maximum empty circle 1904 are of particular use in controlling fabrication processes where contact hole 1800 does not approximate a circle, since these determine measurements are of use for contact holes of any shape and orientation.

Classifying Results Using Similarity of Design Data

The above disclosed methodologies for classifying, sorting and analyzing measurements based upon design data do not specifically highlight the effect of pattern shapes upon fabrication processes. That is, these measurements include defects, abnormal measurements, and so on. By classifying the measurements based upon similarities in design data, defects and other abnormal measurements not specifically associated with pattern shapes may be ignored.

In semiconductor lithography and etching, processing of an individual shape may be affected by presence or absence of, and details of, nearby shapes. For example, contact holes may be more difficult to clear if there are large numbers of nearby contacts, possibly due to partial exhaustion of etching plasma in the near neighborhood during etching. Similarly, features having particular shapes, such as U shapes, may be more prone to particular variations in final width and space than others. It can be desirable to identify such problem features and to determine how strong these nearby-feature and feature-shape effects are on critical dimensions of resulting product.

In an embodiment, a method classifies inspection results based upon similarity of associated design data. A difference value indicative of a difference in shape and size of design data patterns is determined between windowed design data for identified features (e.g., identified defects in the inspection results). The smaller the determined difference value, the greater the similarity of the design data patterns.

FIG. 21A shows an identified first defect 2102, around which a first design data windowing region 2104 is centered and used to isolate first design data pattern 2106 that is associated with first defect 2102. Similarly, FIG. 21B shows an identified second defect 2152, around which a second design data windowing region 2154 is centered and used to isolate second design data pattern 2156 that is associated with second defect 2152. Once isolated, first and second design data patterns 2106 and 2156 are processed to determine a difference value indicative of the similarity in shape and size of patterns 2106 and 2156.

In one example of the processing of patterns 2106 and 2156 to determine similarity, a suitable shift quantity is selected for matching a vertex of pattern 2106 and a vertex of pattern 2156. Distances between sides of pattern 2106 and pattern 2156 are then determined while pattern 2156 is shifted by each shift quantity recognized to be suitable for matching.

FIG. 22 shows pattern 2156 of FIG. 21B overlaid upon pattern 2106 of FIG. 21A such that a first vertex of pattern 2106 coincides with a first vertex of pattern 2156 at location 2202. To determine a similarity, the distance from a first side of pattern 2106 to each side of pattern 2156 is determined and the shortest is selected. This is repeated for other sides of pattern 2106, such that a plurality of shortest distances is determined. Similarly, for each side of pattern 2156, a distance to each side of pattern 2106 is determined and the shortest is selected. In the example of FIG. 22, the shortest distance between the top and left sides of pattern 2106 and pattern 2156 is each zero, since the vertices coincide at location 2202; other selected shortest distances 2204 are shown. The largest of these selected shortest distances 2204 is then used as the difference value that defines the similarity between patterns 2106 and 2156. In an alternate embodiment, instead of selecting a shortest distance, the largest of the average of determined distances may be used as the difference value to define the similarity of patterns.

In yet another embodiment, a ratio $R_{O/A}$ of an area of a polygon $P_{OR}$ obtained by the summation operation OR of the patterns within windowed design data and an area of a polygon $P_{AND}$ obtained by the product operation AND of the patterns in the windowed design data may be used as the difference value defining the similarity of the patterns. Other values obtained from polygons $P_{OR}$ and $P_{AND}$ may be used to define similarity, without departing from the scope hereof.

Furthermore, a value obtained from matching of images converted from the windowed design data may be used as the distance between the windowed design data. However, in the case of using the shortest distance, calculation is fastest because calculation may be discontinued when one of the shortest distances obtained for any side exceeds an allowable distance between the windowed design data after matching.

Difference values obtained by one of the above methods for all pairs of defects identified for a particular test subject (e.g., wafer 122, or shot 123 thereof) may be stored in a table. FIG. 23 shows an exemplary table 2300 that contains difference values, located at the crossing positions, for five identified defects, $D_1$ through $D_5$. For example, entry 2302 has a value of 50 and represents the comparison of defects $D_3$ and $D_4$.

Difference values of table 2300 allow defects to be grouped according to similarity of patters associated with the defects. Using a difference value threshold of 15, table 2300 results in a first grouping that includes defects $D_1$, $D_2$ and $D_3$, and a second grouping that includes $D_4$ and $D_5$. That is, difference values between defects $D_1$, $D_2$ and $D_3$ are less than 15, and difference values of defects $D_4$ and $D_5$ are less than 15.

In the current embodiment and examples, design data is used to determine similarity between patterns associated with identified defects. In alternate embodiments, other data may be used to determine similarity of patterns associated with defects. For example, mask data corresponding to the design data may be processed to determine pattern similarity, and contours of a simulation pattern obtained from a lithography simulation may be used to determine pattern similarity. By classifying and grouping defects based upon pattern similarity, pattern shapes that are associated with large groups of defects can be easily identified.

Method of Obtaining Feedback Information from Distribution of Measured Line Widths of Patterns Line widths are measured for multiple lines in each local inspection region of the wafer, such as each of the inspection regions illustrated in FIG. 2. Within each inspection, a mean measured line width and a standard deviation σ of measured line width is calculated for each drawn line width present in the inspection region.

Figure 25:
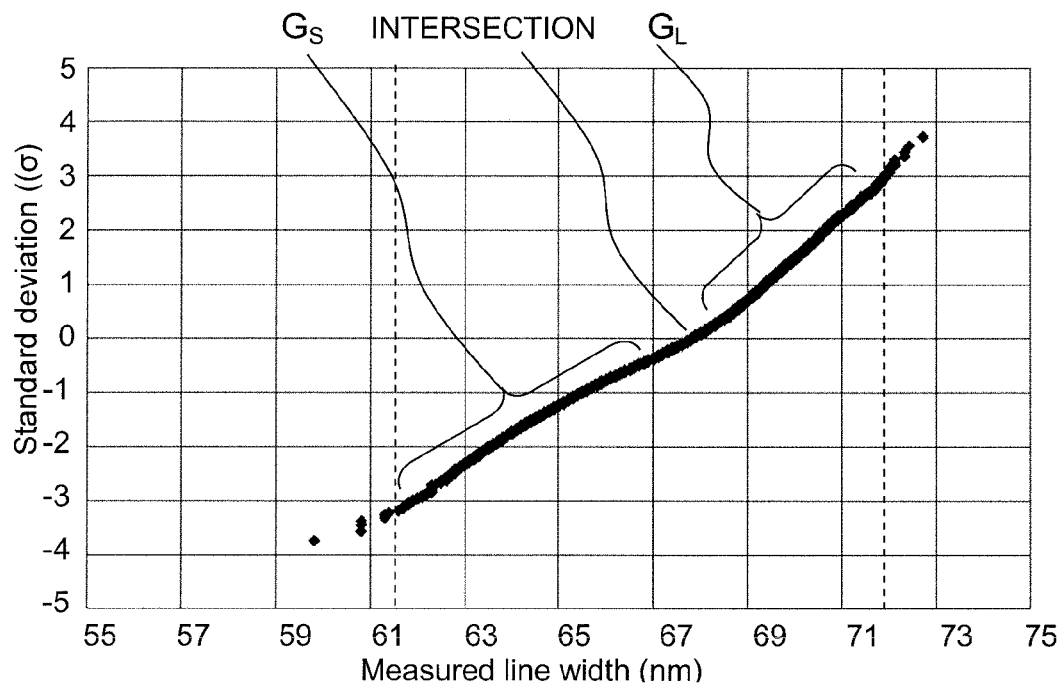
FIG. 25 is a probability plot illustrating a distribution of measured line widths of patterns for a particular process.

FIG. 25 is an exemplary normal probability plot of a distribution of the measured line widths of patterns for a particular process having a particular design value of gate line widths, such as a gate line width of 65 nm, in a particular inspection region of the wafer. Measurements within ±3σ (plus or minus three standard deviations) from a mean exist in a zone between dashed lines in FIG. 25, and inspection limits are automatically set accordingly. Conventionally, zones where a defect is not detected, or is detected, are set before the inspection. In this embodiment, however, the zone is refined by using the obtained measurements and statistics derived from the obtained measurements, so that defect classification accuracy is improved. The detected defect is analyzed by using Method of obtaining feedback information by using information obtained from design data corresponding to location of defect, as explained below.

Measurements of line width outside statistical boundaries are known as outliers. In a particular embodiment, locations of measured line width outside the ±3σ values determined by generating statistics for measured line widths in the local inspection region on a wafer for lines of the same drawn line width are determined to be outliers and presumed to be defects. However, the system is configurable and at a user's option another value, such as for example ±4σ, may be used. In an additional alternative embodiment, limit values for determining defects may be determined as values obtained by multiplying the design value of the gate line width and a specified ratio may be used.

Since lines of different drawn widths will have different means of measured line widths, the mean and standard deviation statistics of line width measurements in the local inspection region are determined separately for lines of differing drawn widths. For example, a first mean and standard deviation statistic is calculated for drawn line widths of fifty nanometers, and a second mean and standard deviation statistic is calculated for drawn line widths of sixty nanometers. Each measured line width is compared to limits determined from the mean measured line width of lines measured with the same drawn line width. In determining defects, measurements of lines drawn at fifty nanometers are tested against the first mean and standard deviation, and measurements of lines drawn sixty nanometers are tested against the second mean and standard deviation. In this embodiment, defect testing of measurements against the statistical mean and standard deviation is performed separately for each of the drawn line widths; lines drawn fifty nanometers are tested for defects against statistics derived from lines drawn fifty nanometers wide, while lines drawn sixty nanometers are tested for defects against statistics derived from lines drawn sixty nanometers wide.

It is known that in some processes, lines of a given line width that are oriented vertically on the wafer may produce different measured line widths than those lines that are oriented horizontally. In an alternative embodiment, a first mean and standard deviation statistic is calculated for vertical lines having a given drawn line width, and a second mean and standard deviation statistic is calculated for horizontal lines having the same drawn line width. Each measured line width is compared to limits determined from the mean and line width associated with the same orientation and drawn line width as the line measured; such that in determining defects measurements of vertical lines are tested against the first mean and standard deviation, and measurements of horizontal lines are tested against the second mean and standard deviation.

When a ratio is used instead of a mean and standard deviation, the ratio may also be determined according to the line width of the drawn pattern.

In the case where the measurements in the region of ±3σ form a normal distribution, a graph of the normal probability plot is a line segment. If the graph is different from a line segment, the measurements in the region are judged as summations of multiple of groups of measurements, where each group of measurements forms a normal distribution. A graph in the region of ±3σ in FIG. 25 may have two line segments, thus, the measurements in the region may be summation of two groups of measurements, each group of measurements forming a normal distribution.

As a method of identifying the groups, a geometrical feature quantity used in the OPC (Optical Proximity Correction) rules is used in an embodiment. For example, a length of a pattern and a minimum distance between a pattern and an adjacent pattern can be used. For each group, feedback information to the OPC rules can be obtained by using 5.18 Method of classifying measurement values based on geometrical information of reference pattern, information of design data, or information of data related to design data of U.S. application Ser. No. 11/434,797 (hereinafter the '797 application), filed May 17, 2006, and incorporated herein by reference.

As another method of identifying the groups, the following procedure performs. First, measurements are separated into two groups $G_L$ and $G_S$ of measurements. The group $G_L$ constitutes larger measurements than a measurement corresponding to an intersection of the two line segments constituting the graph of the normal probability plot. The group $G_S$ constitutes smaller measurements than the measurement corresponding to the intersection. In an embodiment, measurements near the intersection of the two groups are ignored, because they include elements of the group $G_L$ and elements of the group $G_S$. Next, a geometrical feature quantity that separates patterns corresponding to the measurements of the group $G_L$ and patterns corresponding to the measurements of the group $G_S$ is obtained.

In the case where many spaces of patterns corresponding to the measurements of the group $G_L$ are 111 nm, and many spaces of patterns corresponding to the measurements of the group $G_S$ are 122 nm, the space of the pattern is used as a geometrical feature quantity to classify the measurements into groups $G_L$ or $G_S$. In this embodiment, the space of the pattern is defined as a space in a direction perpendicular to a direction of a line width of a gate. In the above, a space of a pattern means a spacing of the measured line from the nearest adjacent line.

Figure 26:
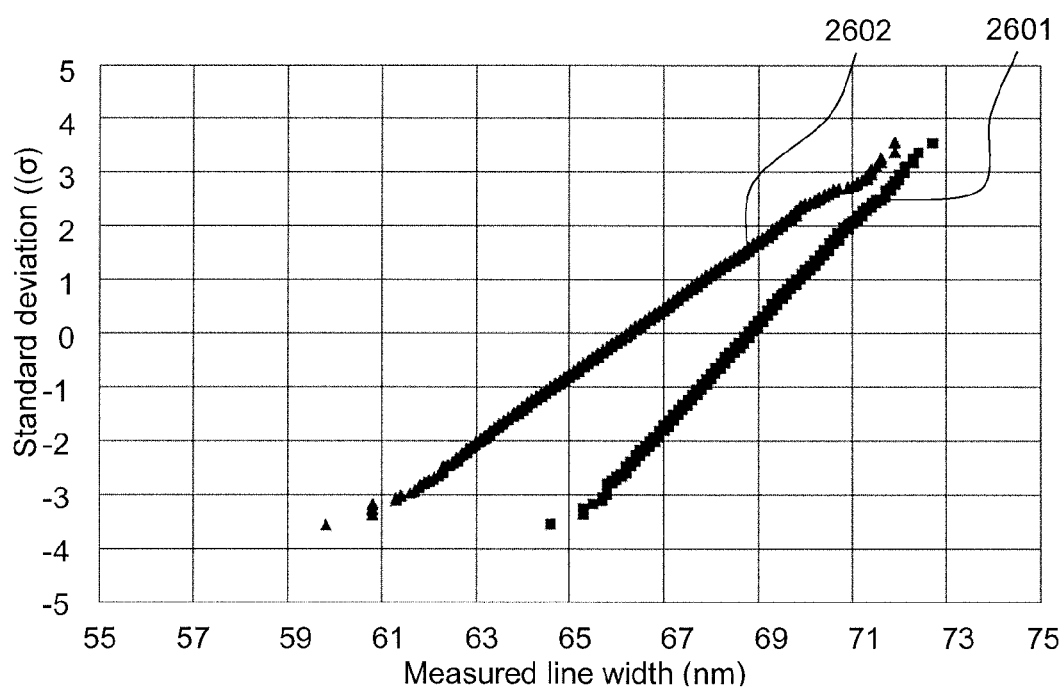
FIG. 26 is normal probability plot of two distributions of measured line widths of patterns, the measured line widths grouped according to line lengths.

FIG. 26 is a set of normal probability plots of distributions of measured line widths of patterns, which resembling those in FIG. 25. Spaces of patterns corresponding to measurements plotted in the right-hand side 2601 in FIG. 26, are 111 nm. Spaces of patterns corresponding to measurements plotted in the left-hand side 2602 in FIG. 26, are 122 nm. The measurements used in FIG. 26 are the same as the measurements used in FIG. 25. Each graph of FIG. 26 is considered as one line segment. It is judged that an OPC rule for patterns whose design value of the gate line widths is 65 nm and spaces of the patterns are 111 nm, and an OPC rule for patterns whose design value of the gate line widths is 65 nm and spaces of the patterns are 122 nm are different. The mean and standard deviation determined for both spaces are part of the feedback information provided for process control.

Line width measurements may be binned into groups for computation of statistics according to a spacing of the measured line from the nearest adjacent line because those lines with minimum line spacing to adjacent lines may tend to have slightly different fabricated dimensions from those with greater line spacing to adjacent lines.

If the above method does not separate the distribution, the above method is applied for other geometrical feature quantities. For example, pattern direction, line end shrinkage, or other geometric characteristics of the line can be used to similarly separate measurements into groups.

In an embodiment, the normal probability plot is used for analyzing the measurements; however, another probability plot may be used.

In alternative embodiments where a distribution consists of more than two distributions, separation of the distribution into multiple groups is performed in the same manner as explained above for the case where the distribution consists of two overlapping distributions. Obtained distribution, and an image, a geometrical feature quantity and a cell name corresponding to a measurement are displayed by using the display device, so that analysis is efficiently performed. In the case of a huge number of the measurements, the measurements are sampled for each zone divided by the standard deviation and the sampled measurements are used for analysis, so that analysis is efficiently performed.

Conventionally, it is necessary to spend huge time to obtain a distribution of measurements, because only line widths of patterns in a limited number of parts of a semiconductor device can be measured. According to this embodiment, line widths of patterns in a large inspection area are obtained automatically, and the obtained line widths are separated, or binned, according to geometrical features. Distribution of measurements can be separated by using a geometrical feature quantity, so that feedback information for an OPC rule can be identified.

Method of Obtaining Feedback Information by Using Information Obtained from Design Data Corresponding to Location of Defect In an embodiment, feedback information is obtained by using a location of a defect and a distribution of patterns similar to a pattern where the defect exists. A location of a defect is obtained by using the method described in section 4.6 The first inspection of the '797 application, the above-described Method of obtaining feedback information from distribution of measured line widths of patterns, electrical characteristics analysis, failure analysis, or the like.

Figure 27:
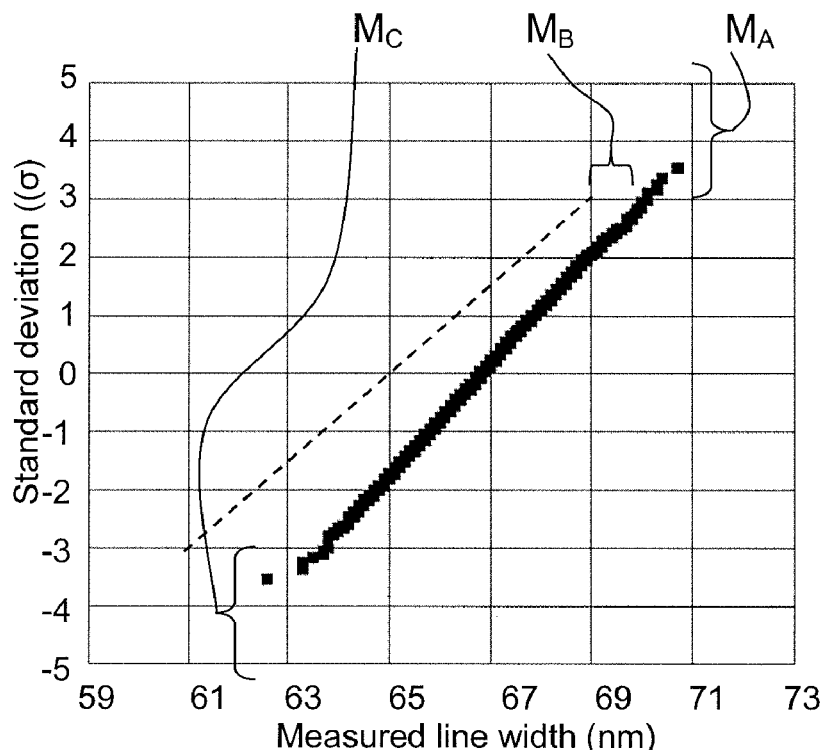
FIG. 27 is a normal probability plot of a distribution of measured line widths of patterns, where the measured line widths include line widths of a defect.

FIG. 27 is a normal probability plot of a distribution of measured line widths of patterns, at the same coordinate values relative a die origin. This distribution represents a distribution of variability in dimensions of a single feature in a die or test pattern across the many instances of that die across the wafer; as such if there are four hundred dies on a wafer, the maximum number of measurements in this distribution that can be obtained from the wafer is four hundred. In FIG. 27, a design value of the gate line widths is 65 nm; however similar distributions will result from other drawn gate line widths that may be similarly processed.

A dashed line in FIG. 27 shows an ideal distribution of line widths containing allowable pattern deformations, and squares in FIG. 27 show measurements of distribution of measured line widths. Measurements outside the ideal distribution of line in FIG. 27, such as "$M_A$" and "$M_B$" are measurements of defects in the inspection region. Defects whose measurements lie within $M_A$ are simple random defects, because the measurements $M_A$ lie outside the $\pm 3\sigma$ range determined from the distribution of the measurements. However, defects whose measurements lie within $M_B$ lie within the $\pm 3\sigma$ range of the distribution of the measurements, so that the defects whose measurements lie within $M_B$ are not only part of simple defects, but representatives of systematic defects of line widths dilated throughout processed die such as may be caused by incorrect OPC rules or the like. In addition, although defects whose measurements are $M_C$ are not detected as defects at the time of the inspection, the defects whose measurements lie within $M_C$ are judged as defects, because the measurements $M_C$ lie outside the $\pm 3\sigma$ range of the distribution of the measurements.

In the above embodiment, the location of the coordinate system based on the die origin is used as the defect location, so that the distribution of measurements is obtained from the patterns fabricated by the almost same condition. A cell name of design data corresponding to a pattern may be used for identifying a location of a defect. The cell name identifies a part of a die, so that distribution of measurements is obtained from the patterns fabricated by the similar mask patterns near a location of mask corresponding to the defect.

Figure 31:
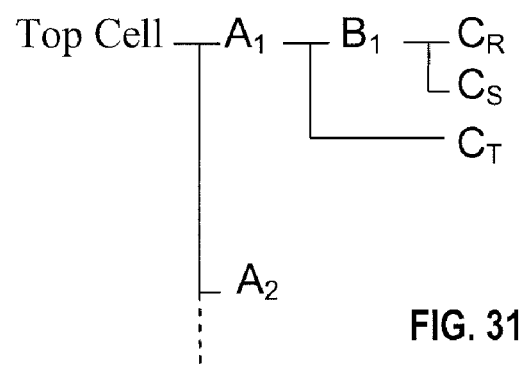
FIG. 31 is a schematic view showing hierarchy of cell names of design data.

Typically, design information for an integrated circuit is present in a hierarchical structure in a design database. Each design has a top cell, the top cell contains further cells each of which has a name, and design shapes may appear at any level of the hierarchy including at leaf cells that contain no further cells, as illustrated in FIG. 31. FIG. 31 is a schematic view showing hierarchy of cell names of design data. There may be more than one top cell in a shot, where each top cell is a separate design for an integrated circuit or top cell. Each line, or portion of a line, or other shape in the design is therefore associated with a particular instance of a cell in the design. Engineers may locate those shapes in a design database from the full hierarchical name, including all instance names, of the cell in which the shape is located and a coordinate in that cell. The system therefore is capable of reporting defects with the hierarchical instance name of the cell in which the defect occurs.

Figure 28:
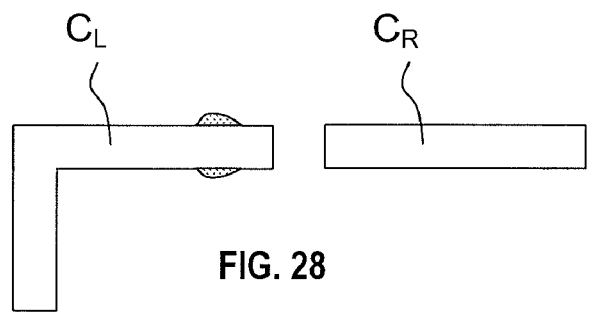
FIG. 28 is a layout view of particular shapes in design data.

FIG. 28 is a layout view showing examples of cell names of particular shapes in design data corresponding to patterns whose design value line widths correspond to a particular width. Although a design value of a line width of a pattern in the left-hand side of FIG. 28 and design value of a line width of a pattern in the right-hand side of FIG. 28 are the same, these are different features that, although they lie in the same inspection region, reside in different cells having different cell names $C_L$ and $C_R$. Parts hatched by dots virtually show defects, which exceed an allowable pattern deformation of a line width as determined from the standard deviations above, or other limits that may be set in a process file. The defects constitute the same distribution, using the above method. However, these defects may constitute different distributions, depending on the difference of the features of the patterns and other nearby shapes. Thus, it is necessary to separate the distribution by using the cell names and analyze. Distributions of measurements corresponding to cell names can be automatically obtained by using the design data; however, the distributions are hard to obtain without using the design data, because a huge number of similar cell data to cell data named $C_R$ may appear.

Figure 29:
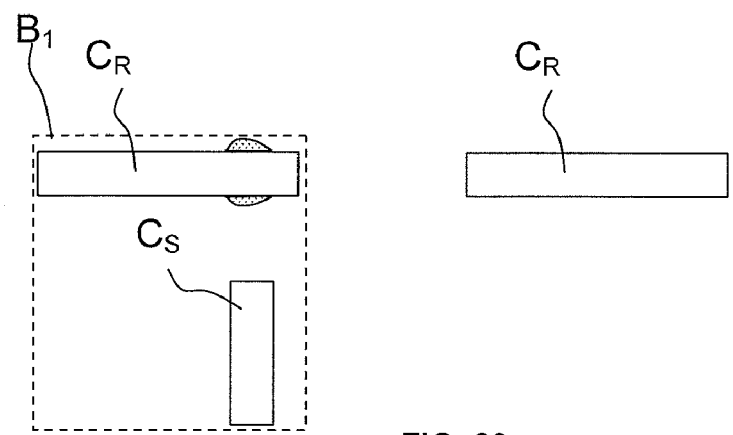
FIG. 29 is a layout view of particular shapes in design data showing how some shapes are close to others in a parent cell.

FIG. 29 is a layout view showing an example of cell names of design data corresponding to patterns having the same line widths and patterns adjacent to the patterns. The cell name $C_R$ of design data corresponds to a pattern in the left-hand side and a pattern in the right-hand side of FIG. 29. A pattern corresponding to a cell name $C_S$ of the design data exists in the neighborhood of the pattern in the left-hand side; however, there is no pattern in the neighboring part of the pattern in the right-hand side. In this case, even if these patterns constitute different distributions due to effect of the adjacent pattern, a method using only the cell name $C_R$ cannot separate the distribution. However, a method using a cell name, which includes the cell name $C_R$ and $C_S$, can separate the distribution. In this case, a cell name $C_1$ that is higher by one level is used.

A location of defect is controlled by using a coordinate system, which is used for describing cell data. The above method is performed by using a set of the cell name and a location of the coordinate system, which is used for describing the cell data, instead of using the location of the coordinate system based on a die origin.

Figure 30:
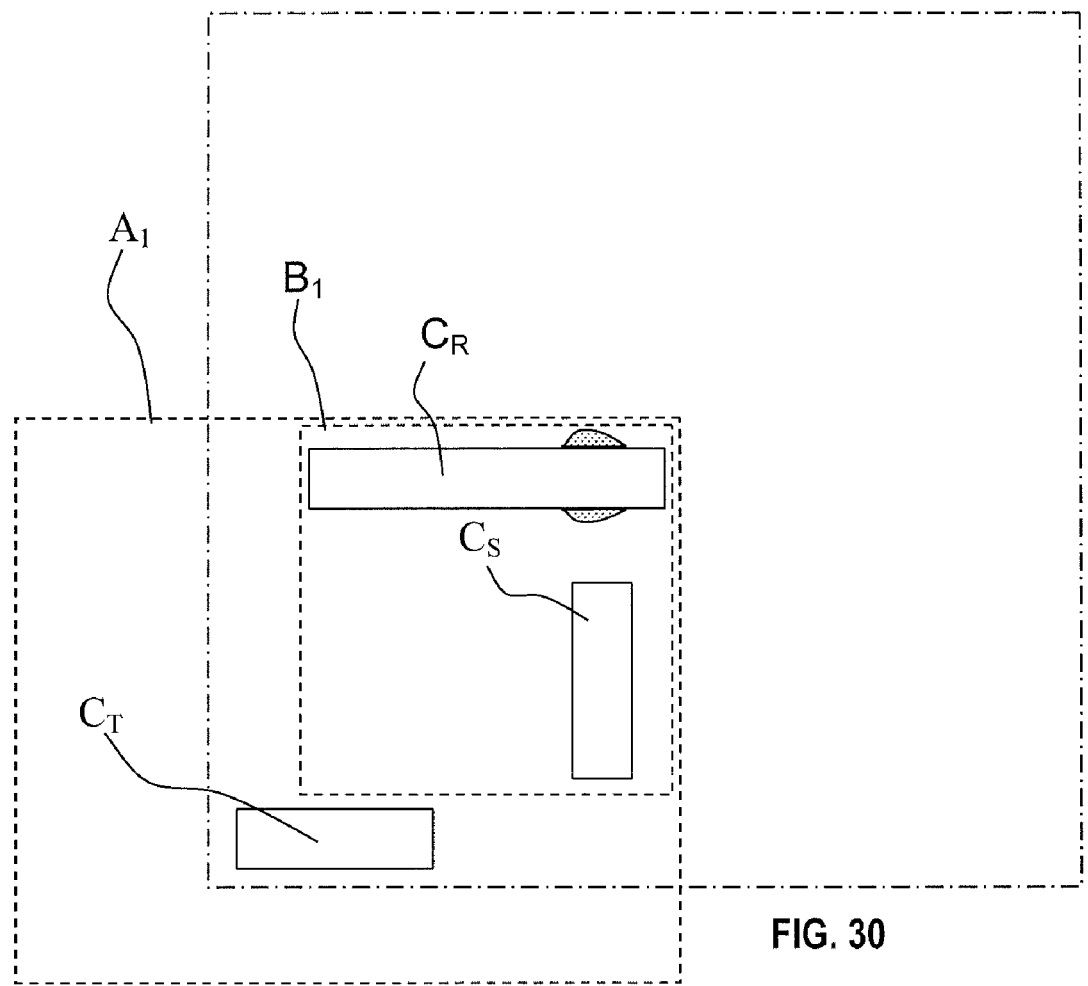
FIG. 30 is an illustration of how shapes in one cell may be close to, and their processing affected by, shapes drawn in another cell of the design.

FIG. 30 is a layout view helpful in understanding a method of obtaining cell names of design data, which includes patterns in a neighboring part of the design. Parts hatched by dots in FIG. 30 virtually show defects, which exceed an allowable pattern deformation of a line width, similar to that of FIG. 29. A square shown by dash and dotted lines in FIG. 30 is a square region whose center is a location of the defect and whose size is a specified size. A size of a proximity effect region, which is affected by optical proximity effects of stepper exposure, is set to the specified size. In the case of an ArF stepper, 2 μm, which is approximately 10 wavelengths of an ArF laser, is used as the size of the proximity effect region. A cell name is obtained for a cell containing the smallest set of patterns in the device layout that are in this proximity effect region near the defect. In an alternative embodiment, arbitrary shape such as a circular region, which is determined by considering a stepper illumination system, is used instead of a square region to more precisely define a region affected by optical proximity effects.

FIG. 31 illustrates the hierarchy of cell names of design data. Cells of design data corresponding to a pattern to which the defect belongs are TopCell, $A_1$, $B_1$, and $C_R$ in descending order. The square shown by the dashed lines in FIG. 30 includes the pattern corresponding to the cell names $C_R$, $C_S$ and $C_T$. A cell name is obtained for the lowest level of the design database hierarchy for a cell within which the set of patterns is located, including patterns corresponding to the cell name $C_R$, $C_S$ and $C_T$. The system checks whether patterns corresponding to a cell name $B_1$, which is one-level higher than the cell name $C_R$, contain all of the shapes within all the cells named $C_R$, $C_S$ and $C_T$. If a pattern corresponding to the cell name $C_T$ does not lie within the cell named $B_1$, the system follows the tree in reverse one level and checks whether the cell named $A_1$, which is one-level higher than the cell named $B_1$, contain all the shapes of interest. Because patterns corresponding to all the cell names lie within the cell named $A_1$, the cell named $A_1$ is a cell having the defect. The cell named $A_1$ may include another cell other than $C_R$, $C_S$ and $C_T$.

Figure 33:
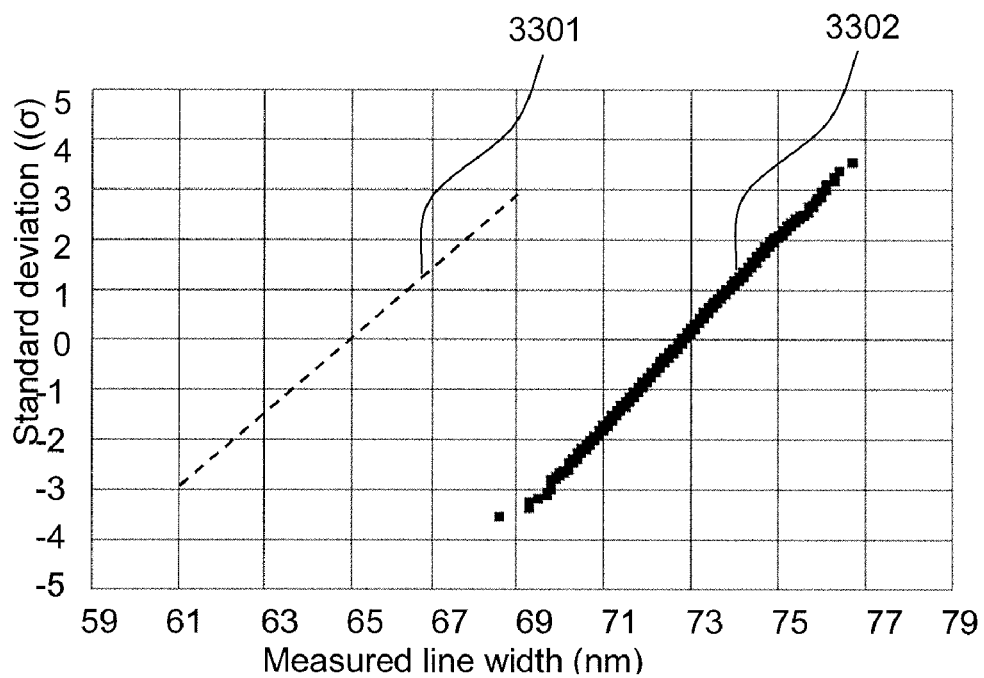
FIG. 33 is a normal probability plot of a distribution of measured line widths of patterns near a defect, such as in the case of a mask defect.

In the case where a defect is detected, the detected defect is classified as a repeated defect or a random defect by using a method similar to 5.1 Method of recognizing repeated defects of '797 application. When the defect is classified as a repeated defect, information about the defect is feedback information useful for process control. FIG. 33 is a normal probability plot of a distribution of measured line widths of patterns near a defect, such as in the case of a defect caused by a defect of a mask pattern. In FIG. 33, the ideal distribution of line widths containing allowable pattern deformations is represented by the dashed line 3301, while the measurements due to the defects having dilated line widths are illustrated as distribution 3302. The distribution 3302 shows that all the measurements are judged as measurements of defect.

Figure 34:
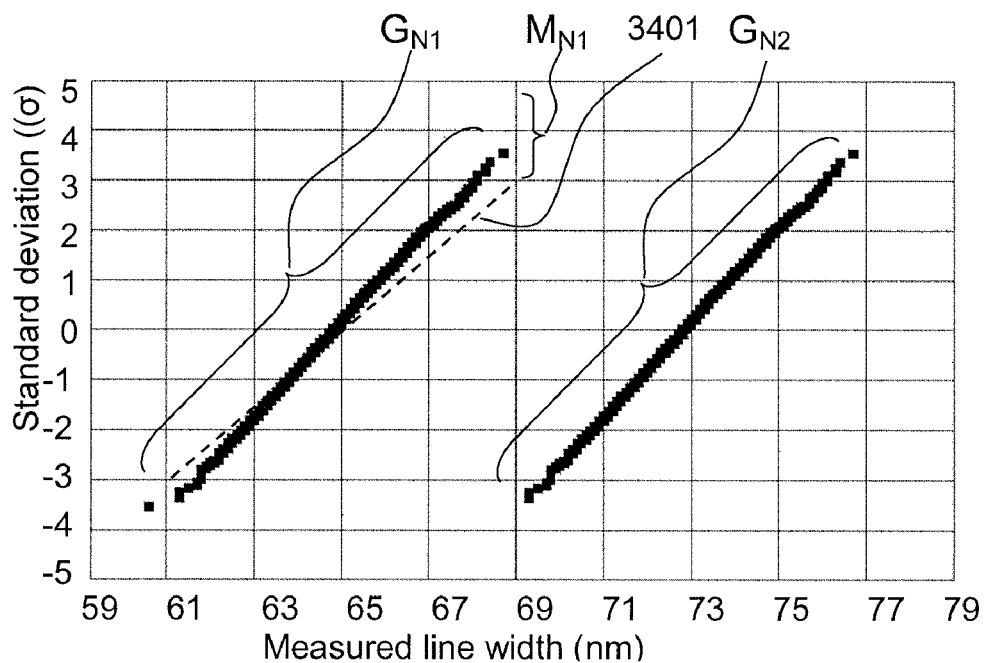
FIG. 34 is a normal probability plot of a distribution of measured line widths of patterns at the same location in each die for each measured die.

In the above, coordinates based on a die origin is used. FIG. 34 is a set of normal probability plots of distributions of measured line widths of patterns, at the same location in each die, for many dies on the wafer. Graph $G_{N1}$ in FIG. 34 is a graph using measurements obtained from dies whose die number is $N_1$, and graph $G_{N2}$ is a graph of measurements obtained from dies whose die number is $G_{N2}$. The graph $G_{N1}$ is similar to a graph of an ideal distribution shown by dashed line 3401 in FIG. 34, however, the graph $G_{N2}$ is not similar to the graph of the ideal distribution. In this case, patterns in dies whose die number is $N_2$ are judged as defects caused by a pattern defect, a particle on a mask, or the like. Measurements $M_{N1}$ in FIG. 34 constitute the graph $G_{N1}$, and lie outside the ±3σ range of the distribution of the measurements. Patterns corresponding to the measurements $M_{N1}$ are judged as random defects on a wafer.

In an alternative embodiment, end shrinkage, a space width between a pattern and a pattern adjacent the pattern, pattern direction, and the like are considered instead of merely considering line widths. Further, the cell name of the design data is used; however, a cell name of mask data may be used. In addition, if transistor ID and wiring ID are added to the cell name, failure analysis or the like may be more efficient.

In the above, the methods of obtaining distribution of measurements obtained from the same location as the defect by using the following coordinate values:

Coordinate values relative to a die origin.
Coordinate values of a coordinate system, which is used for describing cell data.
Coordinate values relative to a shot origin.

For example, the following feedback information are obtained by using the above methods combined:

1. In the case where a measurement of a defect exists in ±3σ range of distribution of measurements obtained by using coordinate values relative to a die origin, feedback information, in which it is necessary to modify an OPC rule, is obtained. If necessary, information for an OPC rule may be identified by using Method of obtaining feedback information from distribution of measured line widths of patterns.

In the case where the above measurement of the defect exists in ±3σ range of distribution of measurements obtained by using coordinate values of a coordinate system, which is used for describing cell data, the feedback information can be confirmed.

2. In the case where the measurement, which is described in the above 1, lies outside the ±3σ range of distribution of measurements obtained by using coordinate values relative to a die origin, feedback information, in which the defect is a random defect, is obtained. The following classification information can be obtained by using distribution of measurements using coordinate values relative to a shot origin:

A. Defects caused by a pattern defect, a particle on a mask, or the like, which exist on part of dies in a shot. In this case, it is necessary to repair a mask on the defect.

B. Defects caused by a pattern defect, a particle on a mask, or the like, which exist on all dies in a shot. In this case, it may be necessary to repair a mask on the defect, however there might be another cause.

C. A random defect on a wafer. In this case, the random defect may be not necessary to identify an OPC rule error or a mask pattern error.

Method of Extracting Set of Patterns that is Sensitive to Process Condition

Conventionally, a simple line pattern having the smallest line width is used for monitoring process condition by using CD-SEM. Because the pattern having the smallest line width is most difficult to fabricate, and a simple line width is easy to measure, the pattern having the smallest line width has been most suitable for the CD-SEM measurement. However, recently a pattern, whose line width is larger than the smallest line width, but which is complex, is more sensitive to process condition. The complex pattern may be easy to measure by using design data.

A set of patterns that is sensitive to process conditions is extracted in view of the background, and the obtained set of dimensions of the pattern are used in the above-mentioned Controlling process conditions using statistics of line width measurements section.

For extracting a set of patterns that is sensitive to process condition, it is necessary that numerous patterns are measured, and measurements are statistically analyzed.

In the above-mentioned section Controlling process conditions using statistics of line width measurements, the following phenomena are explained:

1. In view of measurement accuracy of CD-SEM devices, errors in line width measurements of patterns may be near an allowable error of process conditions. It is desirable to improve measurement accuracy of the line width of the pattern by using an average of measurements of line widths of patterns.

2. Variations in any one process condition of the wafer fabrication may cause large variations in an average of line widths measured over the wafer and smaller variations in a standard deviation of those measurements, or may cause small variations in an average of line widths measured across the wafer and large variations in a standard deviation of those measurements.

In order to solve the above problem and extract a set of patterns that are sensitive to process condition, the following procedure is performed:

1. Shots are fabricated by altering process condition by using the same mask. For example an FEM (Focus Exposure Matrix) wafer, which is exposed by altering focus and dose condition of a stepper, can be used.

2. Measurements are obtained from an inspection region that has sides of 1 micrometer (μm) or greater in length in each shot in the FEM wafer.

3. Measurements are classified for each geometrical feature type of design data near the patterns. Statistics, including averages, standard deviations, maximum values, and minimum values, are obtained from each geometrical feature quantity.

4. A statistic having the largest variation across the process condition is obtained. A set of patterns having the geometrical feature quantity corresponding to the obtained statistic is extracted as the set of patterns that are sensitive to process condition.

5. The above-mentioned Controlling process conditions using statistics of line width measurements, is performed by using the obtained set of patterns and statistic used in the Step 4.

Figure 32:
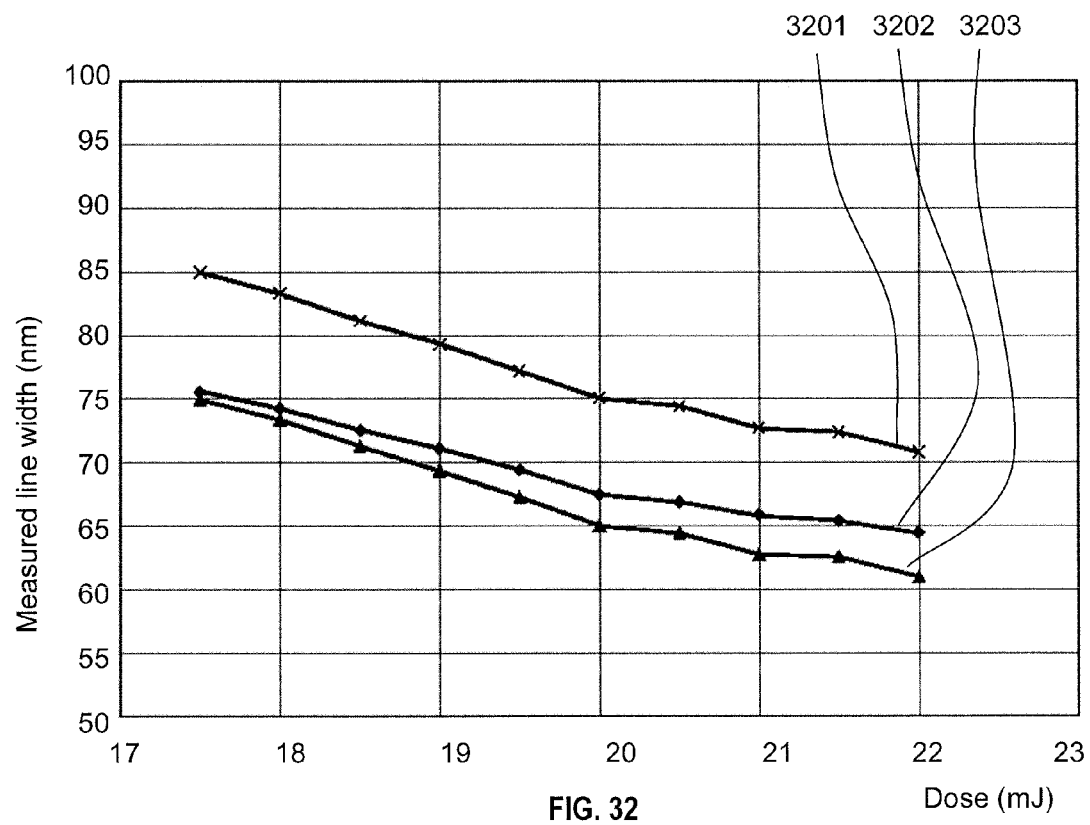
FIG. 32 is an illustration of averages and standard deviations of measurements of line widths, and averages and standard deviations of measurements of end shrinkages.

FIG. 32 is an illustration of a graph showing dependency of averages of measurements of line widths on dose, in the state of optimum focus. Graphs in FIG. 32 are a graph 3201 obtained from a set of patterns having 75 nm line width and 117 nm space width, a graph 3202 obtained from a set of patterns having 65 nm line width and 111 nm space width, and a graph 3203 obtained from a set of patterns having 65 nm line width and 122 nm space width, in the order from the top to bottom. Conventionally, the set of patterns on a die having minimum width and space, such as 65 nm line width and 111 nm space width for a particular process, are used for process control. Patterns on the same die having 75 nm line width and 117 nm space width and a range of the set of patterns having 65 nm line width and 122 nm space width are larger than a range of the set of patterns having 65 nm line width and 111 nm space width. The set of patterns having 75 nm line width and 117 nm space width and the set of patterns having 65 nm line width and 122 nm space width may be judged to be sensitive to process condition, which is one of process conditions.

Figure 35:
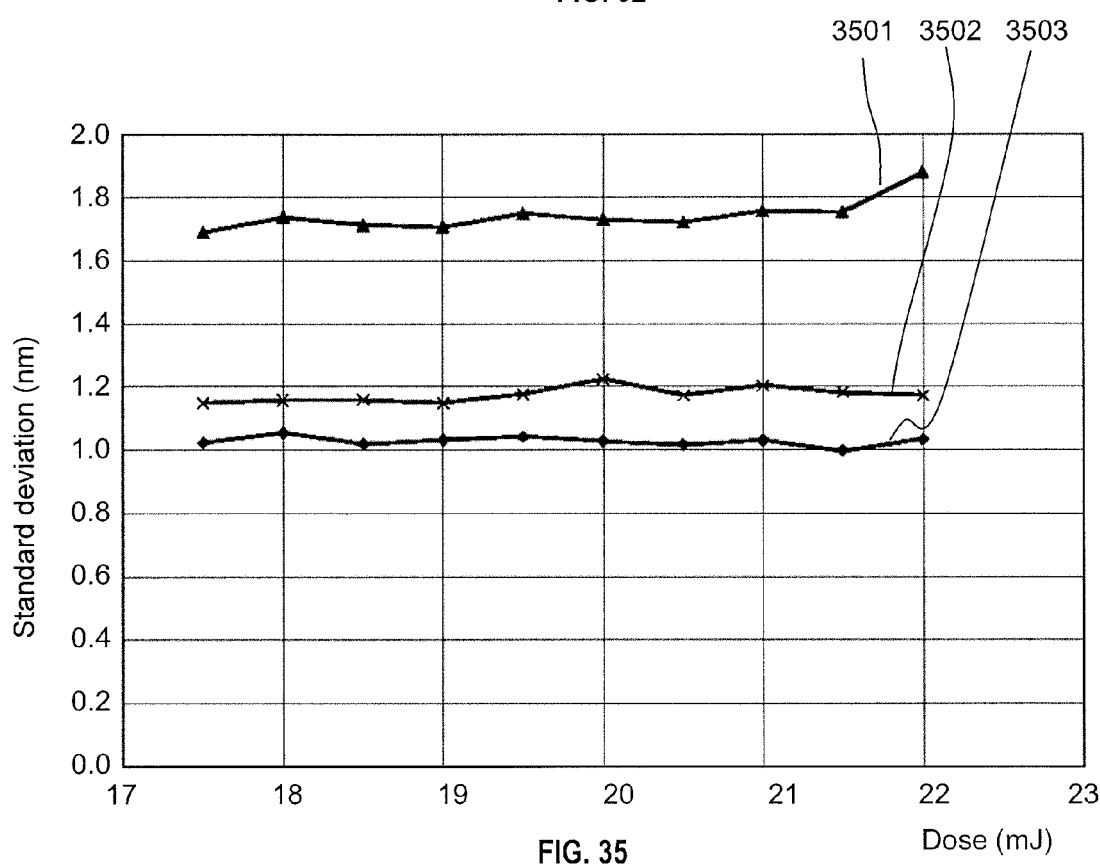
FIG. 35 is an illustration of a graph showing dependency of standard deviations of measurements of line widths on dose, in the state of optimum focus.

FIG. 35 is an illustration of a graph showing dependency of standard deviations of measurements of line widths on dose, in the state of optimum focus. Graphs in FIG. 35 are a graph 3501 obtained from a set of patterns having 65 nm line width and 122 nm space width, a graph 3502 obtained from a set of patterns having 75 nm line width and 117 nm space width, and a graph 3503 obtained from a set of patterns having 65 nm line width and 111 nm space width. Because here is no strong correlation between the standard deviations and the dose in these graphs, the standard deviations are not suitable for controlling dose condition.

The standard deviations of the set of patterns having 75 nm line width and 117 nm space width are smaller than the standard deviations of the set of patterns having 65 nm line width and 122 nm space width. Because an average of measurements having a smaller standard deviation is more accurate than an average of measurements having a larger standard deviation, the set of patterns having 75 nm line width and 117 nm space width is judged to be sensitive to dose condition.

In this embodiment, the line width and the space width are used, however, a line end shrinkage, a cell name of design data, and a cell name of mask data may be used as the geometrical feature quantity of the design data.

According to this embodiment, a set of patterns that are sensitive to process condition are automatically extracted by collecting lines into groups based upon geometrical features of the line and nearby structures. Because the extracted set of patterns reflects variation of process condition with more sensitivity than line width alone, the process can be controlled more tightly than with previous process control methods. Further, it is efficient to control patterns, whose variation of averages of measurements is small, but whose variation of standard deviations of measurements is large. In this case, this embodiment, which can handle a huge number of measurements, is more suitable than the conventional method used in CD-SEM, which can handle a limited number of measurement.

The term "defect" as used herein relates to shapes, such as lines, of a integrated circuit die that are fabricated in a manner that does not fully meet a design engineer's expectations. Although width and/or space may differ from expectations, some of these defects may nevertheless result in fully functioning circuitry. Others of these defects may cause incorrect circuit operation. Identification and analysis of these defects, including those that result in functional circuitry, is of importance to understanding fabrication problems and for increasing the percentages of fully functioning die produced on each wafer.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method of obtaining feedback information, which relates to fabrication of patterns on a wafer based upon fabrication data, the fabrication data derived from design data, comprising:
   capturing for at least one inspection region at least one image of patterns within the inspection region using an imaging device;
   automatically generating from data selected from the fabrication data and the design data, a reference pattern for the inspection regions, the reference pattern comprising a machine-readable representation of at least one of (a) one or more line segments and (b) one or more curves;
   detecting edges within each of the images;
   determining, from the detected edges, one or more measurements for each of the selected patterns; and
   processing the measurements to form statistical information and obtain the feedback information;
   wherein the measurements are grouped into a plurality of groups for statistical analysis by using at least one of
      (i) line widths of patterns in the data,
      (ii) orientations of patterns in the data,
      (iii) length of patterns in the data,
      (iv) space between patterns and adjacent patterns in the data;
      until each distribution of the grouped measurements becomes a normal distribution, and wherein the feedback information is feedback information for an Optical Proximity Correction (OPC) rule.

2. The method of claim 1, further comprising determining defects by comparing the measurements to limits derived from statistical information derived from the measurements and identifying outliers.

3. The method of claim 2, wherein the statistical information comprises a mean and a standard deviation of measurements, and wherein outliers are identified as measurements that are at least a predetermined number of standard deviations from the mean.

4. A method of obtaining feedback information, which relates to fabrication of patterns on a wafer based upon fabrication data, the fabrication data derived from design data, comprising:
   capturing, for at least one inspection region, at least one image of patterns within the inspection region using an imaging device;
   automatically generating from data selected from the fabrication data and the design data, a reference pattern for the inspection region, the reference pattern comprising a machine-readable representation of at least one of (a) one or more line segments and (b) one or more curves;
   detecting edges within each of the images;
   determining, from the detected edges, one or more measurements for each of the selected patterns; and
   processing the measurements to form statistical information and obtain the feedback information;
   wherein the selected patterns are determined by using coordinate values of a cell coordinate system within hierarchical cell data in the data,
   wherein the feedback information is subdivided into
      (i) feedback information for an OPC rule,
      (ii) information that the defect is caused by a pattern defect of a mask pattern or a particle on the mask, and
      (iii) information that the defect is a random defect on the wafer.

5. A method of extracting a set of patterns that are sensitive to process condition on a wafer based upon fabrication data, comprising:
   capturing, for an inspection region, at least one image of patterns within the inspection region using an imaging device;
   automatically generating, from data having a same geometrical feature type, a reference pattern for the inspection region, the reference pattern comprising a machine-readable representation of at least one of (a) one or more line segments and (b) one or more curves;
   detecting edges within each of the images;
   determining, from the edges, one or more measurements for each of the selected patterns;
   processing the measurements to form statistical information;
   processing the measurements of patterns against the statistical information in order to identify the set of patterns;
   wherein the geometrical feature type includes at least one of
      (i) a cell name of design data and
      (ii) a cell name of mask data.

6. The method of claim 5, wherein the statistics include at least one of
   (i) averages,
   (ii) standard deviations,
   (iii) maximum values, and
   (iv) minimum values.

7. The method of claim 5, further comprising controlling at least one process condition using the set of extracted patterns.

8. A system for obtaining feedback information relating to patterns on a wafer fabricated based upon fabrication data derived from design data, the system comprising:
   an imaging device for providing a digital image of at least one inspection region of the wafer; and
   a processing system further comprising at least one processor, and at least one memory, the processing system coupled to receive the digital image from the imaging device into the memory, the memory containing at least a portion of a reference pattern for the inspection region;

wherein the memory of the processing system contains machine readable instructions for:

locating at least one inspection region on the wafer for analysis;

selecting patterns within each inspection region;

capturing into the memory at least one image of patterns within the inspection region from the imaging device;

determining, from detected edges in the images, one or more measurements for each of the selected patterns; and processing the measurements against the statistical information to identify defect locations; and obtaining feedback information;

wherein the measurements are grouped into a plurality of groups for statistical analysis by using at least one of
(i) line widths of patterns in the data,
(ii) orientations of patterns in the data,
(iii) length of patterns in the data,
(iv) space between patterns and adjacent patterns in the data;
until each distribution of the grouped measurements becomes a normal distribution, and wherein the feedback information is feedback information for an Optical Proximity Correction (OPC) rule.

9. The system of claim 8 wherein the statistical information is derived for a same location relative to a die origin across multiple die on the wafer.

10. The system of claim 8 wherein the statistical information is derived for a group of locations in the same inspection region on the wafer.

11. The system of claim 8, wherein the machine readable instructions for determining the measurements comprise instructions for determining at least one measurement selected from the group consisting of
(i) a line width of a measured line,
(ii) a line-end shrinkage of a measured line, and
(iii) a space between a measured line and adjacent shapes in the inspection region.

12. The system of claim 8, wherein defect locations are identified by comparing the measurements to limits derived from statistical information derived from the measurements and identifying outliers.

13. The system of claim 12, wherein the statistical information comprises a mean and a standard deviation of measurements, and wherein outliers are identified as measurements that are at least a predetermined number of standard deviations from the mean.

14. The system of claim 8, wherein the machine readable instructions further comprise instructions for grouping the measurements into a plurality of groups, by at least one geometric feature selected from the group consisting of:
(i) line widths of patterns in the design data,
(ii) orientations of patterns in the design data,
(iii) lengths of patterns in the design data, and
(iv) space distance between patterns in the design data and adjacent patterns;
and the machine readable instructions comprise instructions for determining statistical information for each group of the grouped measurements.

15. An apparatus for obtaining feedback information relating to patterns on a wafer fabricated based upon fabrication data derived from design data, the system comprising:

an imaging device for providing a digital image of at least one inspection region of the wafer;

a device for outputting the feedback information, and an image processing device further comprising at least one processor, and at least one memory, the image processing device coupled to receive the digital image from the imaging device into the memory, the memory containing at least a portion of a reference pattern for the inspection region, the reference pattern being derived automatically from data selected from the group consisting of design data and fabrication data; wherein the memory of the processing system contains machine readable instructions for:

locating at least one inspection region on the wafer for analysis;

selecting patterns within each inspection region;

capturing from the imaging device into the memory at least one image of patterns within the inspection region;

determining from detected edges in the images one or more measurements for each of the selected patterns; and processing the measurements against the statistical information to identify defect locations; and obtaining feedback information, wherein defect locations are identified by comparing the measurements to limits derived from statistical information derived from the measurements and identifying outliers; and the statistical information comprises a mean and a standard deviation of measurements, and wherein outliers are identified as measurements that are at least a predetermined number of standard deviations from the mean.

16. The apparatus of claim 15 wherein the statistical information is derived from similar locations in a plurality of die from a plurality of shots on the wafer, and from multiple inspection regions on the wafer.

17. The apparatus of claim 15 wherein the statistical information is derived from multiple locations within an inspection region.

* * * * *